US007800338B2

(12) United States Patent
Iura et al.

(10) Patent No.: US 7,800,338 B2
(45) Date of Patent: Sep. 21, 2010

(54) METHOD OF DECELERATING ALTERNATING CURRENT MOTOR AND INVERTER APPARATUS

(75) Inventors: Hideaki Iura, Fukuoka (JP); Kazuhiko Hiramatsu, Fukuoka (JP); Mitsujiro Sawamura, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 974 days.

(21) Appl. No.: 11/547,162

(22) PCT Filed: Mar. 28, 2005

(86) PCT No.: PCT/JP2005/005704

§ 371 (c)(1),
(2), (4) Date: Oct. 2, 2006

(87) PCT Pub. No.: WO2005/096489

PCT Pub. Date: Oct. 13, 2005

(65) Prior Publication Data

US 2007/0216340 A1 Sep. 20, 2007

(30) Foreign Application Priority Data

Mar. 31, 2004 (JP) .............................. 2004-103440

(51) Int. Cl.
*H02P 3/18* (2006.01)
*H02P 8/24* (2006.01)

(52) U.S. Cl. .................... 318/801; 318/805; 318/400.07

(58) Field of Classification Search ................. 318/801, 318/805, 806, 798, 808, 762, 800, 811, 400.07, 318/400.14, 400.17
See application file for complete search history.

(56) References Cited

U.S. PATENT DOCUMENTS

| 4,437,050 | A * | 3/1984 | Overzet ....................... 318/798 |
| 4,442,394 | A * | 4/1984 | Beierholm et al. .......... 318/807 |
| 6,229,278 | B1 * | 5/2001 | Garces et al. ............... 318/801 |
| 6,414,455 | B1 * | 7/2002 | Watson ........................ 318/432 |
| 6,937,488 | B2 * | 8/2005 | Eguchi ......................... 363/97 |
| 7,095,208 | B2 * | 8/2006 | Kawaji et al. ............... 318/801 |
| 7,135,833 | B2 * | 11/2006 | DeLange et al. ............. 318/762 |
| 2004/0252533 | A1 * | 12/2004 | Eguchi ......................... 363/97 |

FOREIGN PATENT DOCUMENTS

| JP | 58-165695 A | 9/1983 |
| JP | 5-219771 A | 8/1993 |
| JP | 7-7981 A | 1/1995 |

* cited by examiner

*Primary Examiner*—Walter Benson
*Assistant Examiner*—Eduardo Colon
(74) *Attorney, Agent, or Firm*—Sughrue Mion, PLLC

(57) ABSTRACT

A voltage type inverter apparatus comprising a voltage correcting portion. The voltage correcting portion corrects a given voltage instruction based on a value generated by passing a direct current bus voltage detected value through a first degree delay filter. In decelerating a speed of the alternating current motor, the speed is decelerated in an overexcited state by multiplying the given voltage instruction by a set gain. Simultaneously, a time constant of the first degree delay filter is made larger than a time constant in a normal control state.

8 Claims, 15 Drawing Sheets

METHOD OF DECELERATING ALTERNATING CURRENT MOTOR AND INVERTER APPARATUS

TECHNICAL FIELD

The present invention relates to a method of decelerating an alternating current motor by increasing loss thereof in an inverter apparatus for decelerating the alternating current motor, particularly relates to a method and an apparatus of decelerating an alternating current motor for preventing the inverter apparatus from being stopped abnormally, or preventing the alternating current motor from being burned by a problem of overcurrent or the like in being applied to the alternating current motor which is easy to be saturated magnetically.

RELATED ART

As a conventional art, there has been made a proposal with regard to an inverter apparatus of a voltage type for increasing loss by increasing a motor terminal voltage in braking. (Refer to, for example, Patent Reference 1).

FIG. 13 is a block diagram of an inverter apparatus of a conventional art for converting a commercial power source into a direct current by a rectifying portion 101 and making a voltage rectified thereby smooth by a capacitor 102 to be inputted to an inverter portion 103. The inverter portion 103 provides an alternating current by switching semiconductor elements successively by a signal mentioned later and supplies the alternating current output to an alternating current motor 104 to be driven thereby. Here, the inverter portion 103 is provided with, for example, 6 pieces of transistors 201 through 206 and 6 pieces of diodes 207 through 212 as the semiconductor switching elements. On the other hand, numeral 111 designates a frequency setter and an output signal Sa is inputted to an acceleration/deceleration limiting circuit 120. The acceleration/deceleration limiting circuit 120 increases a terminal voltage of the alternating current 104 by increasing a gain of a voltage control portion 121 by a first output signal $Sb_1$ inputted to the voltage control circuit 121 and a voltage/frequency converting circuit 114, and a second output signal $Sb_2$ inputted only to the voltage control circuit 121 indicating that the motor is being operated to decelerate. Further, the voltage/frequency converting circuit 114 is an analog/digital converting circuit for outputting a pulse signal Sd of a frequency fd in proportion to a voltage Vb of the input signal $Sb_1$. Further, an output signal Sc of the voltage control circuit 113 and the output pulse fd of the voltage/frequency converting circuit 114 are inputted to a modulating circuit 115. The modulating circuit 115 inputs control pulses to the respective transistors 201 through 206 of the inverter 103 by way of a base drive circuit 116 to control to modulate pulse widths thereof. On the other hand, an output voltage of the inverter 103 is determined by ON/OFF time periods of the respective transistors 201 through 206 controlled by the pulse widths of the control pulses, and the pulse width of the control pulse is determined by an output voltage Vc of the voltage control circuit 121. Therefore, the base drive circuit 116 inputted with the control pulses from the modulating circuit 115 outputs base voltages and base currents matching characteristics of the transistors 201 through 206 in accordance with the control pulses to control to switch the transistors 201 through 206. Further, the alternating current motor can be operated by a variable frequency power source by the output of the inverter 103.

An output signal of a setter 118 for setting a predetermined upper limit value of a terminal voltage of the capacitor 102 is inputted to a comparator 119 having a hysteresis characteristic to thereby monitor the terminal voltage of the capacitor 102. Further, when the terminal voltage of the capacitor 102 exceeds the predetermined upper limit value in braking, an output signal $V_{COM}$ is generated from the comparator 119. The acceleration/deceleration limiting circuit 120 follows a set voltage of the frequency setter 111 by a predetermined rate of a change in a slope. Further, during the decelerating operation, an amplification factor of the voltage control circuit 121 is increased. Thereby, the pulse width of the control pulse outputted from the modulating circuit 115 is widened to thereby increase a voltage applied to the alternating current motor 104. In this way, there is made a proposal that iron loss and copper loss of the alternating current motor 104 are increased by increasing the terminal voltage, thereby, the alternating current motor 104 can be decelerated in a short period of time.

Further, as other conventional art, there is proposed an inverter apparatus for calculating a switching output by a function for constituting always same output voltage to a direct current voltage detected by a direct current detecting circuit in an operation other than deceleration and calculating a switching output by a function of a rated direct current voltage value of the alternating current power source in decelerating operation. (refer to, for example, Patent Reference 2)

FIG. 14 is a block diagram showing an inverter apparatus of the conventional art. In the drawing, numeral 301 designates a converter circuit constituting a rectifying circuit for converting an alternating current voltage of an alternating current power source 307 into a direct current voltage, numeral 302 designates a smoothing capacitor for making the direct current voltage of the converter circuit 301 smooth, numeral 303 designates an inverter circuit constituting an inverse converting circuit for converting a direct current voltage of the smoothing capacitor 302 into a predetermined frequency of an alternating current voltage by making switching elements ON/OFF by predetermined timings, numeral 304 designates a microcomputer for controlling the inverter circuit 303 by a PWM control, numeral 305 designates a base amplifier for outputting PWM signals for driving the switching element of the inverter circuit 303, numeral 306 designates a direct current voltage detecting circuit for detecting the direct current voltage of the smoothing capacitor 302, and numeral 350 designates an inverter apparatus constituted by the converter circuit 301 through the direct current detecting circuit 306. Numeral 308 designates an induction motor driven by an alternating current voltage of the inverter circuit 303, numeral 400 designates an operation instruction apparatus for instructing to operate the inverter apparatus 350, the operation instruction apparatus includes a microcomputer 421, a key sheet 422 constituting an input portion to the microcomputer and a display 423 and can set operation instruction of regular rotation, inverse rotation, stop and operation instruction of an output frequency to the inverter apparatus 350. Numeral 314 designates a microcomputer for controlling the inverter circuit 303 by a PWM control, and is constituted by including a switching output calculating circuit 315 for calculating switching output signals in operation instruction other than deceleration and in operation instruction of deceleration, and RAM 316 for storing the operation instructions of regular rotation, inverse rotation, stop and the output frequency set by the operation instruction apparatus 400.

Next, an explanation will be given of an operation when the induction motor is operated in reference to a flowchart of FIG. 15 in operating the motor. First, an operation instruction of, for example, regular rotation is inputted from the operation instruction apparatus 400, next, the operation is started by inputting the operation instruction of an output frequency (step S11). Next, the microcomputer 421 determines whether the motor is stopped by observing whether stop flag is ON at the microcomputer 421 of the operation instruction apparatus 400 (step S12). When it is determined that the motor is not stopped, the microcomputer 314 reads the operation instruction of the output frequency set to a predetermined frequency (step S13), when it is determined that the motor is stopped, the microcomputer 314 reads an instruction of an output frequency of 0 Hz (step S14). Thereafter, the microcomputer 314 determines whether the motor is decelerated by observing whether deceleration flag is on at the microcomputer 421 of the operation instruction apparatus 400 (step S15). Further, when it is determined that the motor is not decelerated, the microcomputer 314 reads the direct current voltage detected by the direct current voltage detecting circuit 306 (step S16), calculates a switching output by a function constituting an output voltage by a set value always relative to the direct current voltage, that is, a function of constituting the same output voltage always relative to the direct current voltage (step S18), outputs the switching output to the base amplifier 305 and drives the switching elements of the inverter circuit 303 by PWM signals to output an alternating current voltage of an output frequency set by the inverter circuit 303 (step S19). Here, the function of constituting the same output voltage always relative to the detected current voltage signifies a function for carrying out an operation of correcting the output voltage relative to a change in the direct current voltage such that the output voltage is not varied with regard to a variation in the direct current voltage. Further, when it is determined that the motor is decelerated, a direct current voltage value of the smoothing capacitor 302 is set to a direct current voltage value of a case of a rated alternating current power source voltage, for example, when the rated alternating current power source voltage is 200 V, the direct current voltage value is set to $200 \times 2^{1/2} = 283$ V (step S17), the switching output is calculated by the function (step S18), the switching output is outputted to the base amplifier 305, the switching elements of the inverter circuit 303 are driven by PWM signals to thereby output the alternating current voltage from the inverter circuit 303 (step S19). Thereby, when the drive current voltage is a rated value, the output voltage of the inverter circuit 303 in deceleration becomes the set value, however, when the direct current voltage is increased by a regenerated power of the induction motor 8, the set value is increased in proportion thereto. That is, although the motor is operated not by a decelerated speed but by, for example, an accelerated speed and a constant speed, even when a power source voltage of the alternating current power source 307 is varied, the output voltage of the inverter circuit 303 becomes the predetermined output voltage, when the motor is operated by a decelerated speed, even when the direct current voltage is increased by a regenerated power, the switching output signal is calculated by the function as the rated value 283 V which is a value lower than the actual direct current voltage value. As a result, the switching elements of the inverter circuit 303 are driven similarly by the function of the direct current voltage value when the alternating current power source 307 is at the rated value regardless of a change in the direct current voltage and therefore, the output voltage is increased in proportion to an increase in the direct current voltage. Here, the function of the direct current voltage value when the alternating current power source 307 is at the rated value signifies a function by which switching when the alternating current power source 307 is at the rated input voltage is carried out even when the direct current voltage is varied and an operation of correcting the output voltage is not carried out. In this way, by an increase in the output voltage of the inverter circuit 303 in deceleration, an exciting current to the induction motor 308 is increased and loss at wirings of the induction motor 308 is increased. According thereto, the regenerated power to the inverter circuit 303 is consumed by the induction motor 308 by an increase in the exciting current to the induction motor 308, the regenerated power to the inverter circuit 303 is reduced more than that of the conventional art and also an increase in the direct current voltage is reduced. Therefore, a deceleration function can be promoted without interrupting a decelerating operation and without being accompanied by a circuit of consuming the regenerated power by a resistor or the like. Further, it is also proposed to increase a decelerating torque by an increase in the exciting current.

Patent Reference 1: JP-A-58-165695
Patent Reference 2: JP-A-5-219771

DISCLOSURE OF THE INVENTION

Problems that the Invention is to Solve

According to the inverter apparatus of the conventional art, it is proposed that by increasing the amplification factor of the voltage control circuit 121 in the decelerating operation, a terminal voltage of the alternating current motor 104 is increased and the motor can be decelerated in a short period of time by increasing the iron loss and the copper loss. Further, it is proposed that in the decelerating operation, even when the direct current voltage is increased by the regenerated power, by increasing the output voltage by calculating the switching output signal by the function as the rated value 283 V constituting the value lower than the actual direct current voltage value, the exciting current to the induction motor 308 is increased, the loss at the wirings of the induction motor 308 is increased and therefore, the decelerating function can be promoted and also the decelerating torque is increased by the increase in the exciting current. The proposals are the methods of shortening the decelerating time period by increasing the loss at the alternating current motor by increasing a magnet flux level of the alternating current motor when the motor is decelerated. However, in recent years, an alternating current motor which is easy to be saturated magnetically is increased, when the methods of the proposals are going to be used as they are, there is a possibility that a predetermined magnetic flux level is not reached and the current flowing in the alternating current motor is rapidly increased, the current is made to flow up to an overcurrent level of the inverter apparatus and the alternating current motor is burned.

The invention has been carried out in view of such a problem and it is an object thereof to provide a method and an apparatus capable of decelerating an alternating current motor and shortening a decelerating time period without bringing about a failure by monitoring a current flowing to the alternating current motor when the alternating current motor is driven by being brought into an overexcited state in deceleration and recovering a normal magnetic flux rate from the overexcited state when the current flowing in the alternating current motor reaches a predetermined value to thereby prevent the current flowing in the alternating current motor from being increased further.

Means for Solving the Problems

In order to resolve the above-described problem, the invention is constituted as follows.

According to the invention, there is provided a method of reducing a speed of an alternating current motor in driving the alternating current motor by a voltage type inverter including a voltage correcting portion for correcting a given voltage instruction by using a value constituted by passing a direct current bus voltage detected value through a first degree delay filter, wherein in reducing the speed of the alternating current motor, the speed is reduced in an overexcited state by making a time constant of the first degree delay filter larger than a time constant thereof in a normal control state.

Further, in an specific enhancement, there is provided the method of reducing a speed of the alternating current motor, wherein when a detected value of a current flowing in the alternating current motor becomes equal to or larger than a predetermined value, the time constant of the first degree delay filter is shortened in accordance with a magnitude of the current to return to the time constant in the normal control state.

Further, in another specific enhancement, there is provided the method of reducing a speed of the alternating current motor, wherein when a detected value of a d axis current flowing in the alternating current motor becomes equal to or larger than a predetermined value, a time constant of the first degree delay filter is shortened in accordance with a magnitude of the d axis current to return to the time constant in the normal control state.

Further, in another specific enhancement, there is provided the method of reducing a speed of the alternating current motor, wherein when a detected value of a q axis current flowing in the alternating current motor becomes equal to or larger than a predetermined value, a time constant of the first degree delay filter is shortened in accordance with a magnitude of the q axis current to return to the time constant in the normal control state.

Further, in another aspect of the invention, there is provided a voltage type inverter apparatus including:

a voltage correcting portion for correcting a given voltage instruction by using a value constituted by passing a direct current bus voltage detected value through a first degree delay filter, wherein in decelerating a speed of the alternating current motor, the speed is decelerated in an overexcited state by making a time constant of the first degree delay filter larger than a time constant in a normal control state.

Further, in a specific enhancement, in the inverter apparatus when a detected value of a current flowing in the alternating current motor becomes equal to or larger than a predetermined value, the time constant of the first degree delay filter is shortened in accordance with a magnitude of the current to return to the time constant in the normal control state.

Further, in a specific enhancement, in the inverter apparatus when a detected value of a d axis current flowing in the alternating current motor becomes equal to or larger than a predetermined value, the time constant of the first degree delay filter is shortened in accordance with a magnitude of the d axis current to return to the time constant in the normal control state.

Further, in another specific enhancement, in the inverter when a detected value of a q axis current flowing in the alternating current motor becomes equal to or larger than a predetermined value, the time constant of the first degree delay filter is shortened in accordance with a magnitude of the q axis current to return to the time constant in the normal control state.

Further, in another aspect of the invention, there is provided a method of reducing a speed of an alternating current motor in driving the alternating motor by a voltage type inverter, wherein in decelerating a speed of the alternating current motor, the speed is reduced in an overexcited state by multiplying a given voltage instruction by a set gain, when a detected value of the current flowing in the alternating current motor becomes equal to or larger than a first predetermined value, the gain is reduced in accordance with a magnitude of the current, and when the detected value of the current becomes equal to or larger than a second predetermined value, the gain returned to 1.

Further, in another aspect of the invention, there is provided a method of reducing a speed of an alternating current motor in driving the alternating motor by a voltage type inverter, wherein in decelerating a speed of the alternating current motor, the speed is reduced in an overexcited state by multiplying a given voltage instruction by a set gain, when a detected value of a d axis current flowing in the alternating current motor becomes equal to or larger than a first predetermined value, the gain is reduced in accordance with a magnitude of the current, and when the detected value of the current becomes equal to or larger than a second predetermined value, the gain returned to 1.

Further, in another aspect of the invention, there is provided a method of reducing a speed of an alternating current motor in driving the alternating motor by a voltage type inverter, wherein in decelerating a speed of the alternating current motor, the speed is reduced in an overexcited state by multiplying a given voltage instruction by a set gain, when a detected value of a q axis current flowing in the alternating current motor becomes equal to or larger than a first predetermined value, the gain is reduced in accordance with a magnitude of the current, and when the detected value of the current becomes equal to or larger than a second predetermined value, the gain returned to 1.

Further, in another aspect of the invention, there is provided a voltage type inverter apparatus, wherein when a speed of an alternating current motor is reduced, the speed is reduced in an overexcited state by multiplying a given voltage instruction by a set gain, when a detected value of a current flowing in the alternating current motor becomes equal to or larger than a first predetermined value, the gain is reduced in accordance with a magnitude of the current, and when the detected value of the current is equal to or larger than a second predetermined value, the gain is returned to 1.

Further, in another aspect of the invention, there is provided a voltage type inverter apparatus, wherein when a speed of an alternating current motor is reduced, the speed is reduced in an overexcited state by multiplying a given voltage instruction by a set gain, when a detected value of a d axis current flowing in the alternating current motor becomes equal to or larger than a first predetermined value, the gain is reduced in accordance with a magnitude of the current, and when the detected value of the current is equal to or larger than a second predetermined value, the gain is returned to 1.

Further in another aspect of the invention, there is provided a voltage type inverter apparatus, wherein when a speed of an alternating current motor is reduced, the speed is reduced in an overexcited state by multiplying a given voltage instruction by a set gain, when a detected value of a q axis current flowing in the alternating current motor becomes equal to or larger than a first predetermined value, the gain is reduced in accordance with a magnitude of the current, and when the detected value of the current is equal to or larger than a second predetermined value, the gain is returned to 1.

Further in another aspect of the invention, there is provided a method of reducing a speed of an alternating current motor in driving an alternating current motor by a voltage type inverter, wherein in decelerating a speed of the alternating current motor, the speed is reduced in an overexcited state by multiplying a given voltage instruction by a gain in accordance with a direct current bus voltage detected value, when a detected value of a current flowing in the alternating current motor becomes equal to or larger than a first predetermined value, the gain is reduced in accordance with a magnitude of the current, and when the detected value of the current is equal to or larger than a second predetermined value, the gain is returned to 1.

Further, in another aspect of the invention, there is provided a method of reducing a speed of an alternating current motor in driving an alternating current motor by a voltage type inverter, wherein in decelerating a speed of the alternating current motor, the speed is reduced in an overexcited state by multiplying a given voltage instruction by a gain in accordance with a direct current bus voltage detected value, when a detected value of a d axis current flowing in the alternating current motor becomes equal to or larger than a first predetermined value, the gain is reduced in accordance with a magnitude of the current, and when the detected value of the current is equal to or larger than a second predetermined value, the gain is returned to 1.

Further, in another aspect of the invention, there is provided a method of reducing a speed of an alternating current motor in driving an alternating current motor by a voltage type inverter, wherein in decelerating a speed of the alternating current motor, the speed is reduced in an overexcited state by multiplying a given voltage instruction by a gain in accordance with a direct current bus voltage detected value, when a detected value of a q axis current flowing in the alternating current motor becomes equal to or larger than a first predetermined value, the gain is reduced in accordance with a magnitude of the current, and when the detected value of the current is equal to or larger than a second predetermined value, the gain is returned to 1.

Further, in another aspect of the invention, there is provided a voltage type inverter apparatus, wherein in reducing a speed of an alternating current motor, the speed is reduced in an overexcited state by multiplying a given voltage instruction by a gain in accordance with a direct current bus voltage detected value, when a detected value of a current flowing in the alternating current motor becomes equal to or larger than a first predetermined value, the gain is reduced in accordance with a magnitude of the current, and when the detected value of the current is equal to or larger than a second predetermined value, the gain is returned to 1.

Further, in another aspect of the invention, there is provided a voltage type inverter apparatus, wherein in reducing a speed of an alternating current motor, the speed is reduced in an overexcited state by multiplying a given voltage instruction by a gain in accordance with a direct current bus voltage detected value, when a detected value of a d axis current flowing in the alternating current motor becomes equal to or larger than a first predetermined value, the gain is reduced in accordance with a magnitude of the current, and when the detected value of the current is equal to or larger than a second predetermined value, the gain is returned to 1.

Further, in another aspect of the invention, there is provided a voltage type inverter apparatus, wherein in reducing a speed of an alternating current motor, the speed is reduced in an overexcited state by multiplying a given voltage instruction by a gain in accordance with a direct current bus voltage detected value, when a detected value of a q axis current flowing in the alternating current motor becomes equal to or larger than a first predetermined value, the gain is reduced in accordance with a magnitude of the current, and when the detected value of the current is equal to or larger than a second predetermined value, the gain is returned to 1.

Further in another aspect of the invention, there is provided a method of reducing a speed of an alternating current motor in driving an alternating current motor by a voltage type inverter including a voltage correcting portion for correcting a given voltage instruction by using a value constituted by passing a direct current bus voltage detected value through a first degree delay filter, wherein in reducing the speed of the alternating current motor, the speed is reduced in an overexcited state by multiplying a given voltage instruction by a set gain simultaneously with making a time constant of a first degree delay filter larger than a time constant in a normal control state.

Further, in a specific enhancement, there is provided the method of reducing a speed of the alternating current motor, wherein when a detected value of a current flowing in the alternating current motor becomes equal to or larger than a predetermined value, the time constant of the first degree delay filter is shortened in accordance with the magnitude of the current to return to the time constant in the normal control state, or when the detected value of the current becomes equal to or larger than a first predetermined value, the gain is reduced in accordance with a magnitude of the current, and when the detected value of the current becomes equal to or larger than a second predetermined value, the gain is returned to 1 or both thereof are executed.

Further, in another specific enhancement, there is provided the method of reducing a speed of the alternating current motor, wherein when a detected value of a d axis current flowing in the alternating current motor becomes equal to or larger than a predetermined value, the time constant of the first degree delay filter is shortened in accordance with a magnitude of the d axis current to return to the time constant in the normal control state, or when the detected value of the d axis current becomes equal to or larger than a first predetermined value, the gain is reduced in accordance with a magnitude of the current, and when the detected value of the d axis current becomes equal to or larger than a second predetermined value, the gain is returned to 1 or both thereof are executed.

Further, in another specific enhancement, there is provided the method of reducing a speed of the alternating current motor, wherein when a detected value of a q axis current flowing in the alternating current motor becomes equal to or larger than a predetermined value, the time constant of the first degree delay filter is shortened in accordance with a magnitude of the q axis current to return to the time constant in the normal control state, or when the detected value of the q axis current becomes equal to or larger than a first predetermined value, the gain is reduced in accordance with a magnitude of the current, and when the detected value of the q axis current becomes equal to or larger than a second predetermined value, the gain is returned to 1 or both thereof are executed.

Further, in another specific enhancement, there is provided a voltage type inverter apparatus including a voltage correcting portion for correcting a given voltage instruction by using a value constituted by passing a direct current bus voltage detected value through a first degree delay filter, wherein in reducing a speed of the alternating current motor, the speed is reduced in an overexcited state by multiplying the given voltage instruction by a set gain simultaneously with making a time constant of the first degree delay filter larger than a time constant in a normal control state.

Further, in a specific enhancement, in the inverter apparatus when a detected value of a current flowing in the alternating current motor becomes equal to or larger than a predetermined value, the time constant of the first degree delay filter is shortened to return to the time constant in the normal control state, or when the detected value of the current becomes equal to or larger than a first predetermined value, the gain is reduced in accordance with a magnitude of the current, and when the detected value of the current is equal to or larger than the second predetermined value, the gain is returned to 1 or both thereof are executed.

Further, in another specific enhancement, in the inverter apparatus when a detected value of a d axis current flowing in the alternating current motor becomes equal to or larger than a predetermined value, the time constant of the first degree delay filter is shortened in accordance with the magnitude of the d axis current to return to the time constant in the normal control state, or when the detected value of the d axis current becomes equal to or larger than a first predetermined value, the gain is reduced in accordance with the magnitude of the current, and when the detected value of the d axis current becomes equal to or larger than a second predetermined value, the gain is returned to 1 or both thereof are executed.

Further in another specific enhancement, in the inverter apparatus, when a detected value of a q axis current flowing in the alternating current motor becomes equal to or larger than a predetermined value, the time constant of the first degree delay filter is shortened in accordance with a magnitude of the q axis current to return to the time constant in the normal control state, or when the detected value of the q axis current becomes equal to or larger than a first predetermined value, the gain is reduced in accordance with the magnitude of the current, and when the detected value of the current becomes equal to or larger than a second predetermined value, the gain is returned to 1 or both thereof are executed.

Further, in another aspect of the invention, there is provided a method of reducing a speed of an alternating current motor in driving the alternating current motor by a voltage type inverter, wherein when an instruction of reducing a speed thereof is inputted, while maintaining only a voltage instruction in a frequency and the voltage instruction currently outputted, only the frequency is reduced, and when a speed of the alternating current motor is reduced to a predetermined frequency, the speed of the alternating current motor is reduced in an overexcited state by reducing the speed by a rate set with the frequency and the voltage.

Further, in a specific enhancement, in the method of reducing a speed of an alternating current motor, wherein when a detected value of a current flowing in the alternating current motor becomes equal to or larger than a predetermined value, in accordance with a magnitude of the current, even before reducing a frequency to a predetermined value, also the voltage instruction is reduced, and a rate of the frequency to the voltage is returned to a rate in a normal control state.

Further, in another specific enhancement, in the method of reducing a speed of an alternating current motor when a detected value of a d axis current flowing in the alternating current motor becomes equal to or larger than a predetermined value, in accordance with a magnitude of the d axis current, even before reducing a frequency to a predetermined value, also the voltage instruction is reduced, and a rate of the frequency to the voltage is returned to a rate in a normal control state.

Further, in another specific enhancement, in the method of reducing a speed of an alternating current motor when a detected value of a q axis current flowing in the alternating current motor becomes equal to or larger than a predetermined value, in accordance with a magnitude of the q axis current, even before reducing a frequency to a predetermined value, also the voltage instruction is reduced, and a rate of the frequency to the voltage is returned to a rate in a normal control state.

Further, in another aspect of the invention, there is provided a voltage type inverter apparatus for driving an alternating current motor, wherein when an instruction of reducing a speed of the alternating current motor is inputted, while maintaining only a voltage instruction in a frequency and the voltage instruction currently outputted, only the frequency is reduced, and when a speed of the alternating current motor is reduced to a predetermined frequency, the speed of the alternating current motor is reduced in an overexcited state by reducing the speed of the alternating current motor by a rate set with a frequency and the voltage.

Further, in another specific enhancement, in the inverter apparatus when a detected value of a current flowing in the alternating current motor becomes equal to or larger than a predetermined value, in accordance with a magnitude of the current, even before reducing a frequency to a predetermined value, also the voltage instruction is reduced, and a rate of the frequency to the voltage is returned to a rate in a normal control state.

Further in another specific enhancement, in the inverter apparatus when a detected value of a d axis current flowing in the alternating current motor becomes equal to or larger than a predetermined value, in accordance with a magnitude of the d axis current, even before reducing a frequency to a predetermined value, also the voltage instruction is reduced, and a rate of the frequency to the voltage is returned to a rate in a normal control state.

Further, in another specific enhancement, in the inverter apparatus when a detected value of a q axis current flowing in the alternating current motor becomes equal to or larger than a predetermined value, in accordance with a magnitude of the q axis current, even before reducing the frequency to a predetermined value, also the voltage instruction is reduced, and a rate of the frequency to the voltage is returned to a rate in a normal control state.

Further in another aspect of the invention, there is provided a method of reducing a speed of an alternating current motor in driving the alternating current motor by a voltage type inverter including a voltage correcting portion for correcting a given voltage instruction by using a value constituted by passing a direct current bus voltage detected value through a first degree delay filter, wherein in reducing a speed of the alternating current motor, when an instruction of reducing a speed is inputted simultaneously with making a time constant of the first degree delay filter larger than a time constant in a normal control state, while maintaining only a voltage instruction in a frequency and the voltage instruction currently outputted, only the frequency is reduced, and when a speed of the alternating current motor is reduced to a predetermined frequency, the speed is reduced in an overexcited state by reducing the speed by a rate set with the frequency and the voltage.

Further, in another specific enhancement, in the method of reducing a speed of an alternating current motor when a detected value of a current flowing in the alternating current motor becomes equal to or larger than a predetermined value, the time constant of the first degree delay filter is shortened, in accordance with a magnitude of the current to return to the time constant in a normal control state, or when the detected value of the current becomes equal to or larger than the predetermined value, in accordance with the magnitude of the current, even before reducing the frequency to a predetermined value, also the voltage instruction is reduced, and the rate of the frequency and the voltage is returned to a rate in a normal control state or both thereof are executed.

Further, in another specific enhancement, in the method of reducing a speed of an alternating current motor when a detected value of a d axis current flowing in the alternating current motor becomes equal to or larger than a predetermined value, the time constant of the first degree delay filter is shortened, in accordance with a magnitude of the d axis current to return to the time constant in the normal control state, or when the detected value of the d axis current becomes equal to or larger than a predetermined value, in accordance with the magnitude of the d axis current, even before reducing a frequency to a predetermined value, also the voltage instruction is reduced, and the rate of the frequency to the voltage is returned to a rate in the normal control state or both thereof are executed.

Further, in another specific enhancement, in the method of reducing a speed of an alternating current motor when a detected value of a q axis current flowing in the alternating current motor becomes equal to or larger than a predetermined value, the time constant of the first degree delay filter is shortened, in accordance with a magnitude of the q axis current to return to a time constant in a normal control state, or when the detected value of the q axis current becomes equal to or larger than a predetermined value, in accordance with a magnitude of the q axis current, even before reducing the frequency to a predetermined value, also the voltage instruction is reduced, and the rate of the frequency to the voltage is returned to a rate in the normal control state or both thereof are executed.

Further in another aspect of the invention, there is provided a voltage type inverter apparatus including a voltage correcting portion for correcting a given voltage instruction by using a value constituted by passing a direct current bus voltage detected value through a first degree delay filter, wherein in reducing a speed of the alternating current motor, a time constant of the first degree delay filter is made to be larger than a time constant in a normal control state, simultaneously therewith, when an instruction of reducing the speed is inputted, while maintaining only a voltage instruction in a frequency and the voltage instruction currently outputted, only the frequency is reduced, and when the speed of the alternating current motor is reduced to a predetermined frequency, the speed of the alternating current motor is reduced in an overexcited state by reducing the speed by a rate set with the frequency and the voltage.

Further, in another specific enhancement, in the inverter apparatus when a detected value of a current flowing in the alternating current motor becomes equal to or larger than a predetermined value, the time constant of the first degree delay filter is shortened in accordance with a magnitude of the current to return to a time constant in a normal control state, or when the detected value of the current becomes equal to or larger than the predetermined value, in accordance with a magnitude of the current, even before reducing the frequency to a predetermined value, also the voltage instruction is reduced, and a rate of the frequency to the voltage is returned to a rate in the normal control state or both thereof are executed.

Further, in another aspect of the invention, in the inverter apparatus when a detected value of a d axis current flowing in the alternating current motor becomes equal to or larger than a predetermined value, the time constant of the first degree delay filter is shortened in accordance with a magnitude of the d axis current to return to the time constant in the normal control state, or when the detected value of the d axis current becomes equal to or larger than a predetermined value, in accordance with the magnitude of the d axis current, even before reducing a frequency to a predetermined value, also the voltage instruction is reduced, and a rate of the frequency to the voltage is returned to a rate in the normal control state of both thereof are executed.

Further, in another aspect of the invention, in the inverter apparatus when a detected value of a q axis current flowing in the alternating current motor becomes equal to or larger than a predetermined value, the time constant of the first degree delay filter is shortened in accordance with a magnitude of the q axis current to return to a time constant in a normal control state, or when the detected value of the q axis current becomes equal to or larger than the predetermined value, in accordance with the magnitude of the q axis current, even before reducing the frequency to a predetermined value, also the voltage instruction is reduced, and the rate of the frequency to the voltage is returned to a rate in the normal control state or both thereof are executed.

Advantage of the Invention

According to the invention, in reducing the speed, the speed is reduced in the overexcited state by making the time constant of the first degree delay filter larger than the time constant in the normal control state and therefore, the speed can be reduced by a time period shorter than that at a normal magnetic flux level.

Further, according to the invention, when the detected value of the current flowing in the alternating current motor is equal to or larger than the predetermined value, the time constant of the first degree delay filter is adjusted in accordance with the magnitude of the current and therefore, even in a case of an alternating current motor which is easy to be saturated magnetically, the speed can be reduced to stop the alternating current motor without stopping the inverter by the overcurrent or burning the alternating current motor.

Further, according to the invention, when the detected value of d axis current flowing in the alternating current motor is equal to or larger than the predetermined value, the time constant of the first degree delay filter is adjusted in accordance with the magnitude of the d axis current and therefore, even in the case of an alternating current motor which is easy to be saturated magnetically, the speed can be reduced to stop the alternating current motor without stopping the inverter by the overcurrent or burning the alternating current motor.

Further, according to the invention, when the detected value of q axis current flowing in the alternating current motor is equal to or larger than the predetermined value, the time constant of the first degree delay filter is adjusted in accordance with the magnitude of the q axis current and therefore, even in the case of an alternating current motor which is easy to be saturated magnetically, the speed can be reduced to stop the alternating current motor without stopping the inverter by the overcurrent or burning the alternating current motor.

Further, according to the invention, in reducing a speed, the speed is reduced in the overexcited state by making the time constant of the first degree delay filter larger than the time constant in the normal control state and therefore, there can be provided the inverter apparatus the speed of which is reduced by a time period shorter than that at a normal magnetic flux level.

Further, according to the invention, when the detected value of the current flowing in the alternating current motor is equal to or larger than the predetermined value, the time constant of the first degree delay filter is adjusted in accordance with the magnitude of the current and therefore, even in the case of the alternating current motor which is easy to be saturated magnetically, there can be provided the inverter apparatus the speed of which is reduced to stop the alternating current motor without stopping the inverter by the overcurrent or burning the alternating current motor.

Further, according to the invention, when the detected value of the d axis current flowing in the alternating current motor is equal to or larger than the predetermined value, the time constant of the first degree delay filter is adjusted in accordance with the magnitude of the d axis current and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, when the detected value of the q axis current flowing in the alternating current motor is equal to or larger than the predetermined value, the time constant of the first degree delay filter is adjusted in accordance with the magnitude of the q axis current and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, the speed is reduced in the overexcited state by multiplying the given voltage instruction by the set gain and therefore, the speed can be reduced by a time period shorter than that at the normal magnetic flux level, the gain is reduced in accordance with the magnitude of the current flowing in the alternating current motor and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, the speed is reduced in the overexcited state by multiplying the given voltage instruction by the set gain and therefore, the speed can be reduced by the time period shorter than that at the normal magnetic flux level, the gain is reduced in accordance with the magnitude of the d axis current flowing in the alternating current motor and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, the speed is reduced in the overexcited state by multiplying the given voltage instruction by the set gain and therefore, the speed can be reduced by the time period shorter than that at the normal magnetic flux level, the gain is reduced in accordance with the magnitude of the current flowing in the alternating current motor and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, the speed is reduced in the overexcited state by multiplying the given voltage instruction by the set gain and therefore, the speed can be reduced by the time period shorter than that at the normal magnetic flux level, the gain is reduced in accordance with the magnitude of the current flowing in the alternating current motor and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, the speed is reduced in the overexcited state by multiplying the given voltage instruction by the set gain and therefore, the speed can be reduced by the time period shorter than that at the normal magnetic flux level, the gain is reduced in accordance with the magnitude of the d axis current flowing in the alternating current motor and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, the speed is reduced in the overexcited state by multiplying the given voltage instruction by the set gain and therefore, the speed can be reduced by the time period shorter than that at the normal magnetic flux level, the gain is reduced in accordance with the magnitude of the q axis current flowing in the alternating current motor and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, the speed is reduced in the overexcited state by multiplying the given voltage instruction by the gain in accordance with the direct current bus voltage detected value and therefore, the speed can be reduced by the time period shorter than that at the normal magnetic flux level, the gain is reduced in accordance with the magnitude of the current flowing in the alternating current motor and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, the speed is reduced in the overexcited state by multiplying the given voltage instruction by the gain in accordance with the direct current bus voltage detected value and therefore, the speed can be reduced by the time period shorter than that at the normal magnetic flux level, the gain is reduced in accordance with the magnitude of the d axis current flowing in the alternating current motor and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, the speed is reduced in the overexcited state by multiplying the given voltage instruction by the gain in accordance with the direct current bus voltage detected value and therefore, the speed can be reduced by the time period shorter than that at the normal magnetic flux level, the gain is reduced in accordance with the magnitude of the q axis current flowing in the alternating current motor and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, the speed is reduced in the overexcited state by multiplying the given voltage instruction by the gain in accordance with the direct current bus voltage detected value and therefore, the speed can be reduced by the time period shorter than that at the normal magnetic flux level, the gain is reduced in accordance with the magnitude of the current flowing in the alternating current motor and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, the speed is reduced in the overexcited state by multiplying the given voltage instruction by the gain in accordance with the direct current bus voltage detected value and therefore, the speed can be reduced by the time period shorter than that at the normal magnetic flux level, the gain is reduced in accordance with the magnitude of the d axis current flowing in the alternating current motor and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, the speed is reduced in the overexcited state by multiplying the given voltage instruction by the gain in accordance with the direct current bus voltage detected value and therefore, the speed can be reduced by the time period shorter than that at the normal magnetic flux level, the gain is reduced in accordance with the magnitude of the q axis current flowing in the alternating current motor and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, the speed is reduced in the overexcited state by multiplying the given voltage instruction by the set gain simultaneously with making the time constant of the first degree delay filter larger than the time constant in the normal control state and therefore, the speed can be reduced by the time period shorter than that at the normal magnetic flux level.

Further, according to the invention, in accordance with the magnitude of the current flowing in the alternating current motor, the time constant of the first degree delay filter is adjusted, or the gain is adjusted in accordance with the magnitude of the current, or the both are adjusted and therefore, even in the case of the alternating current motor which is easy to be saturated magnetically, the speed can be reduced to stop the alternating current motor without stopping the inverter by the overcurrent or burning the alternating current motor.

Further, according to the invention, in accordance with the magnitude of the d axis current flowing in the alternating current motor, the time constant of the first degree delay filter is adjusted, or the gain is adjusted in accordance with the magnitude of the d axis current, or the both are adjusted and therefore, even in the case of the alternating current motor which is easy to be saturated magnetically, the speed can be reduced to stop the alternating current motor without stopping the inverter by the overcurrent or burning the alternating current motor.

Further, according to the invention, in accordance with the magnitude of the q axis current flowing in the alternating current motor, the time constant of the first degree delay filter is adjusted, or the gain is adjusted in accordance with the magnitude of the q axis current, or the both are adjusted and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, the speed is reduced in the overexcited state by multiplying the given voltage instruction by the set gain, simultaneously with making the time constant of the first degree delay filter larger than the time constant in the normal control state and therefore, there can be provided the inverter apparatus the speed of which is reduced by the time period shorter than that at the normal magnetic flux level.

Further, according to the invention, in accordance with the magnitude of the current flowing in the alternating current motor, the time constant of the first degree delay filter is adjusted, or the gain is adjusted in accordance with the magnitude of the current, or the both are adjusted and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in accordance with the magnitude of the d axis current flowing in the alternating current motor, the time constant of the first degree delay filter is adjusted, or the gain is adjusted in accordance with the magnitude of the d axis current, or the both are adjusted and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in accordance with the magnitude of the q axis current flowing in the alternating current motor, the time constant of the first degree delay filter is adjusted, or the gain is adjusted in accordance with the magnitude of the q axis current, or the both are adjusted and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, when the instruction of reducing the speed is inputted, while maintaining only the voltage instruction in the frequency and the voltage instruction currently outputted, only the frequency is reduced, when the speed is reduced to the predetermined frequency, by reducing the speed by the rate set with the frequency and the voltage, the speed is reduced in the overexcited state and therefore, the speed can be reduced by the time period shorter than that at the normal magnetic flux level.

Further, in accordance with the magnitude of the current flowing in the alternating current motor, the rate of the frequency to the voltage is adjusted and therefore, even in the case of the alternating current motor which is easy to be saturated magnetically, the speed can be reduced to stop the alternating current motor without stopping the inverter by the overcurrent or burning the alternating current motor.

Further, according to the invention, in accordance with the magnitude of the d axis current flowing in the alternating current motor, the rate of the frequency to the voltage is adjusted and therefore, even in the case of the alternating current motor which is easy to be saturated magnetically, the speed can be reduced to stop the alternating current motor without stopping the inverter by the overcurrent or burning the alternating current motor.

Further, according to the invention, in accordance with the magnitude of the q axis current flowing in the alternating current motor, the rate of the frequency to the voltage is adjusted and therefore, even in the case of the alternating current motor which is easy to be saturated magnetically, the speed can be reduced to stop the alternating current motor without stopping the inverter by the overcurrent or burning the alternating current motor.

Further, according to the invention, when the instruction of reducing the speed is inputted, while maintaining only the voltage instruction in the frequency and the voltage instruction currently outputted, only the frequency is reduced, when the speed is reduced to the predetermined frequency, by reducing the speed by the rate set with the frequency and the voltage, the speed is reduced in the overexcited state and therefore, there can be provided the inverter apparatus for reducing the speed in the time period shorter than that at the normal magnetic flux level.

Further, according to the invention, in accordance with the magnitude of the current flowing in the alternating current motor, the rate of the frequency to the voltage is adjusted and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in accordance with the magnitude of the d axis current flowing in the alternating current motor, the rate of the frequency to the voltage is adjusted and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in accordance with the magnitude of the q axis current flowing in the alternating current motor, the rate of the frequency to the voltage is adjusted and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in reducing the speed, while maintaining only the voltage instruction in the frequency and the voltage instruction currently outputted when the instruction of reducing the speed is inputted simultaneously with making a time constant of the first degree delay filter larger than the time constant in the normal control state, only the frequency is reduced, when the speed is reduced to the predetermined frequency, the speed is reduced in the overcurrent state by reducing the speed by the rate set with the frequency and the voltage and therefore, the speed can be reduced by the time period shorter than that at the normal magnetic flux level.

Further, according to the invention, in accordance with the magnitude of the current flowing in the alternating current motor, the time constant of the first degree delay filter is adjusted, or the rate of the frequency to the voltage is adjusted in accordance with the magnitude of the current, or the both are executed and therefore, even in the case of the alternating current motor which is easy to be saturated magnetically, the speed can be reduced to stop the alternating current motor without stopping the inverter by the overcurrent or burning the alternating current motor.

Further, according to the invention, in accordance with the magnitude of the d axis current flowing in the alternating current motor, the time constant of the first degree delay filter is adjusted, or the rate of the frequency to the voltage is adjusted in accordance with the magnitude of the d axis current, or the both are executed and therefore, even in the case of the alternating current motor which is easy to be saturated magnetically, the speed can be reduced to stop the alternating current motor without stopping the inverter by the overcurrent or burning the alternating current motor.

Further, according to the invention, in accordance with the magnitude of the current flowing in the alternating current motor, the time constant of the first degree delay filter is adjusted, or the rate of the frequency to the voltage is adjusted in accordance with the magnitude of the current, or the both are executed and therefore, even in the case of the alternating current motor which is easy to be saturated magnetically, the speed can be reduced to stop the alternating current motor without stopping the inverter by the overcurrent or burning the alternating current motor.

Further, according to the invention, in reducing the speed, while maintaining only the voltage instruction in the frequency and the voltage instruction currently outputted when the instruction of reducing the speed is inputted simultaneously with making a time constant of the first degree delay filter larger than the time constant in the normal control state, only the frequency is reduced, when the speed is reduced to the predetermined frequency, the speed is reduced in the overcurrent state by reducing the speed by the rate set with the frequency and the voltage and therefore, there can be provided the inverter apparatus for reducing the speed in the time period shorter than that at the normal magnetic flux level.

Further, according to the invention, in accordance with the magnitude of the current flowing in the alternating current motor, the time constant of the first degree delay filter is adjusted, or the rate of the frequency to the voltage is adjusted in accordance with the magnitude of the current, or the both are executed and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in accordance with the magnitude of the d axis current flowing in the alternating current motor, the time constant of the first degree delay filter is adjusted, or the rate of the frequency to the voltage is adjusted in accordance with the magnitude of the d axis current, or the both are executed and therefore, even in the case of the alternating current motor which is easy to be saturated magnetically, there can be provided the inverter apparatus for reducing the speed to stop the alternating current motor without stopping the inverter by the overcurrent or burning the alternating current motor.

Further, according to the invention, in accordance with the magnitude of the current flowing in the alternating current motor, the time constant of the first degree delay filter is adjusted, or the rate of the frequency to the voltage is adjusted in accordance with the magnitude of the current, or the both are executed and therefore, even in the case of the alternating current motor which is easy to be saturated magnetically, there can be provided the inverter apparatus for reducing the speed to stop the alternating current motor without stopping the inverter by the overcurrent or burning the alternating current motor.

DESCRIPTION OF REFERENCE NUMERALS AND SIGNS

Figure 1:
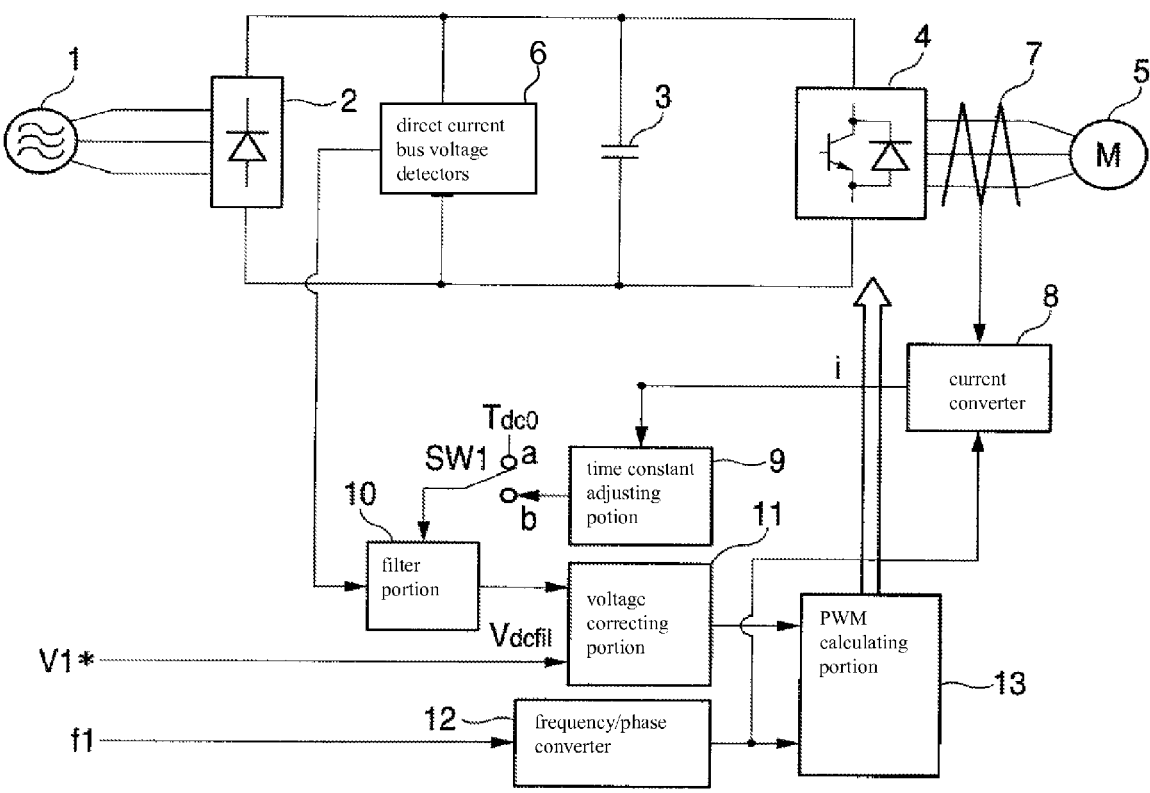
FIG. 1 is a block diagram of a first embodiment of an inverter apparatus applied with a method of the invention.

1, 307 alternating current power sources
2 converter portion
3, 102 capacitors
4, 103 inverter portions
5 alternating current motor
6, 117 direct current bus voltage detectors
7 current detector
8 current converter
9 time constant adjusting portion
10 filter portion
11 voltage correcting portion
12 frequency/phase converter
13 PWM calculating portion
14 gain adjusting portion
15 multiplier
16 gain calculating portion
17 direct current bus voltage standardizing portion
18 voltage instruction adjusting portion
19 voltage instruction maintaining portion
20 voltage instruction reducing amount calculating portion
21 limit portion
SW1, SW2, SW3, SW4 switches
101 rectifier
104 alternating current motor
111 frequency setter
114 voltage/frequency converting circuit
115 modulating circuit
116 base drive circuit
118 setter
119 comparator
120 acceleration/deceleration limiting circuit
121 voltage control circuit
201 through 206 transistors
207 through 212 flywheel diodes
301 converter circuit
302 smoothing capacitor
303 inverter circuit
304, 314, 421 microcomputers
305 base amplifier
306 direct current voltage detecting circuit
308 induction motor
315 output calculating portion
316 RAM
350 inverter apparatus
400 operation instruction apparatus
422 key sheet
423 display

BEST MODE FOR CARRYING OUT THE INVENTION

A specific embodiment of a method of the invention will be explained in reference to the drawings as follows.

Embodiment 1

Figure 2:
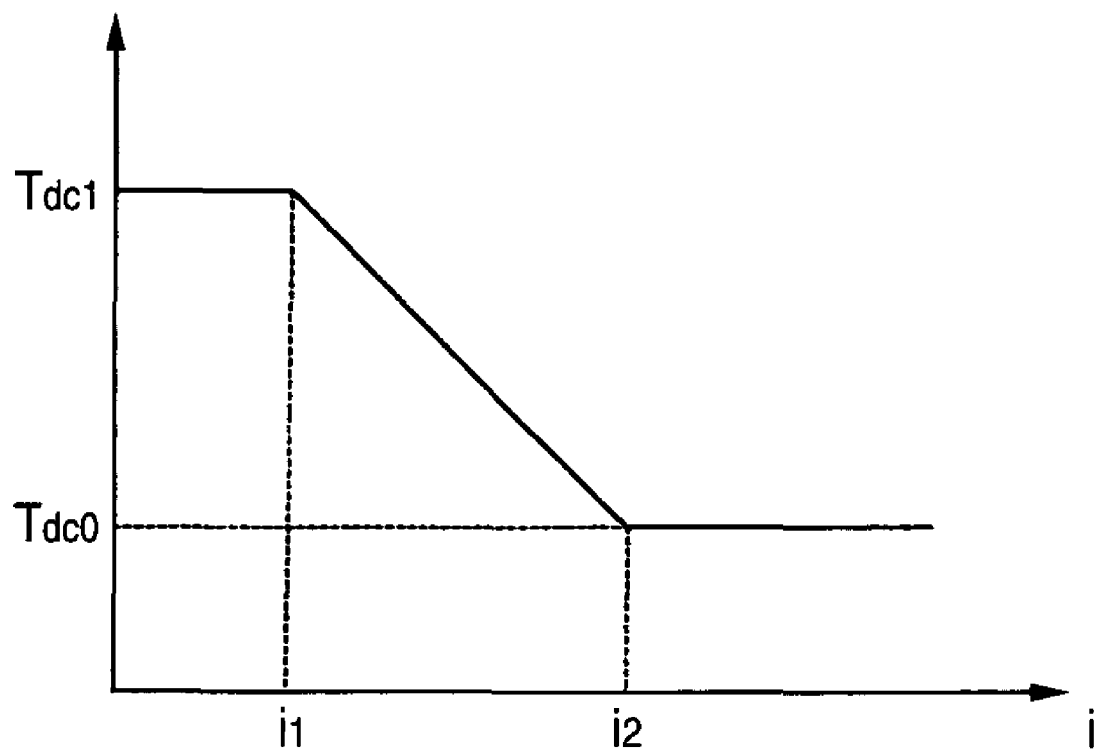
FIG. 2 shows an example of a time constant adjusting portion.

FIG. 1 is a block diagram of a first embodiment of an inverter apparatus applied with a method of the invention, FIG. 2 shows an example of a time constant adjusting portion. A control apparatus of an induction motor according to the embodiment includes an alternating current power source 1, a converter portion 2, a capacitor 3, an inverter portion 4, an alternating current motor 5, a direct current bus voltage detector 6, a current detector 7, a current converter 8, a time constant adjusting portion 9, a filter portion 10, a voltage correcting portion 11, a frequency/phase converter 12, a PWM calculating portion 13, and a switch SW1. The converter portion 2 of the inverter apparatus rectifies an alternating current voltage of the alternating current power source 1 to thereby convert into a direct current voltage. The capacitor 3 makes the direct current voltage converted by the converter portion 2 smooth. The inverter portion 4 controls a power element by a PWM control to thereby convert the direct current into an alternating current having arbitrary frequency and voltage to be supplied to the alternating current motor 5. The direct current bus voltage detector 6 detects a direct current bus voltage $V_{dc}$ applied across both ends of the capacitor 3. The current detector 7 detects a current supplied to the alternating current motor 5. The current converter 8 separates the current detected by the current detector 7 to a current i1 flowing in the alternating current motor and a torque current detector value iq and an exciting current detected value id. The time constant adjusting portion 9 adjusts a time constant $T_{dc}$ used at the filter portion 10 in accordance with a magnitude of the current flowing in the alternating current motor 5. The filter portion 10 outputs the direct current bus voltage $V_{dc}$ detected by the direct current bus voltage detector 6 as a direct current bus voltage corrected value $V_{dcfil}$ constituted by passing the direct current bus voltage $V_{dc}$ through the first delay filter having the time constant $T_{dc}$. The voltage correcting portion 11 calculates a voltage instruction corrected value from the direct current bus voltage corrected value $V_{dcfil}$ such that an arbitrary voltage instruction V1* and an output voltage of the inverter portion 4 coincide with each other. The frequency/phase converter 12 calculates a voltage phase by inputting an arbitrary output frequency f1. The PWM calculating portion 13 calculates a PWM signal from the voltage instruction corrected value from the voltage correcting portion 11 and the voltage phase from the frequency/phase converter 12. The power element of the inverter portion 4 is driven by the PWM signal outputted from the PWM calculating portion 13. An embodiment of the time constant adjusting portion 9 will be explained by a time constant adjusting portion calculating a current as the abscissa and calculating a time constant at the ordinate as shown by FIG. 2. The time constant used in the filter portion 10 is calculated in accordance with the magnitude of the current inputted to the time constant adjusting portion 9 and a specific operation thereof will be described later.

A specific explanation will be given of an operation in a case of shifting from a normal operating state to a decelerated state according to the invention. First, in a normal control state, SW1 is set to a side, the motor is operated by a previously set filter time constant $T_{dc0}$, and therefore, the output voltage of the inverter portion 4 coincides with the voltage instruction value V1*. When a deceleration instruction is inputted, SW1 is switched to b side. At this occasion the filter constant becomes a time constant $T_{dc1}$ far longer than the filter time constant $T_{dc0}$. Therefore, during deceleration, the direct current bus voltage corrected value $V_{dcfil}$ outputted by the filter portion 10 is maintained at a value in starting the deceleration. Actually, by decelerating the motor, the direct current bus voltage is increased and therefore, the voltage correcting portion 11 is not operated correctly but calculates a voltage instruction corrected value to output an output voltage larger than arbitrary voltage instruction. Thereby, the alternating current motor 5 is brought into an overexcited state and therefore, iron loss, copper loss or the like at the alternating current motor 5 is increased and therefore, a regenerated power returning to the side of the inverter apparatus is reduced, the inverter apparatus is made to be difficult to be brought into an overvoltage state, and a decelerating time period can be made to be shorter than that in a normal magnetic flux level. When a time period has elapsed to some degree after starting the deceleration, the direct current bus voltage corrected value $V_{dcfil}$ outputted by the filter portion 10 gradually approaches a true value and therefore, the voltage correcting portion 11 is gradually operated correctly. When a load inertia of the alternating current motor 5 is large, the direct current bus voltage corrected value $V_{dcfil}$ becomes the true value before being decelerated to stop, the higher the speed the larger the rotational energy provided to the alternating current motor, the smaller the speed, the smaller the energy. Therefore, by constituting the filter time constant by $T_{dc1}$ in starting to decelerate the motor, the motor can be brought into the overexcited state when the motor is provided with the large speed and therefore, an effect of capable of shortening a decelerating time period even when the direct current bus voltage corrected value $V_{dcfil}$ gradually becomes true value in the midst of deceleration is significant.

On the other hand, in recent years, the alternating current motor 5 which is easy to be saturated magnetically is increased, even when the motor is intended to be brought into the overexcited state, the motor is saturated magnetically, only the current flows and the magnetic flux is not increased further. When the inverter apparatus of the conventional art 2 is applied to the alternating current motor which is easy to be saturated magnetically, the motor is controlled by setting 283 V in deceleration and therefore, when the alternating current motor 5 is saturated magnetically, an excessively large current flows in the alternating current motor 5, and there is a possibility that the inverter apparatus becomes abnormal by the overcurrent, or the alternating current motor 5 is burned by the current. Hence, according to the invention, as shown by FIG. 2, in accordance with a current i1 flowing in the alternating current motor 5, the filter time constant $T_{dc}$ is set to $T_{dc1}$ which is far longer than the normal filter time constant $T_{dc0}$ by a multiplication factor of about 10 through 10000 until i1 becomes $i1_1$, when the current exceeds the filter time constant is gradually shortened, and is returned to the normal filter time constant $T_{dc0}$ when the current becomes $i1_2$, thereby, the direct current bus voltage corrected value $V_{dcfil}$ swiftly approaches the true value and therefore, the motor is returned to the normal magnetic flux state from the overexcited state. By setting $i1_1$ or $i1_2$ previously from a characteristic of the inverter apparatus and a characteristic of the alternating current motor, the decelerating time period can be shortened without a concern of the abnormal overcurrent of the inverter apparatus and burning the alternating current motor 5 even in the case of the alternating current motor which is easy to be saturated magnetically. Further, even when the filter time constant is not adjusted in accordance with the current i1 flowing in the alternating current motor 5 but the filter time constant is adjusted in accordance with the torque current detected value iq or the exciting current detected value id, a similar effect is achieved.

Embodiment 2

Figure 3:
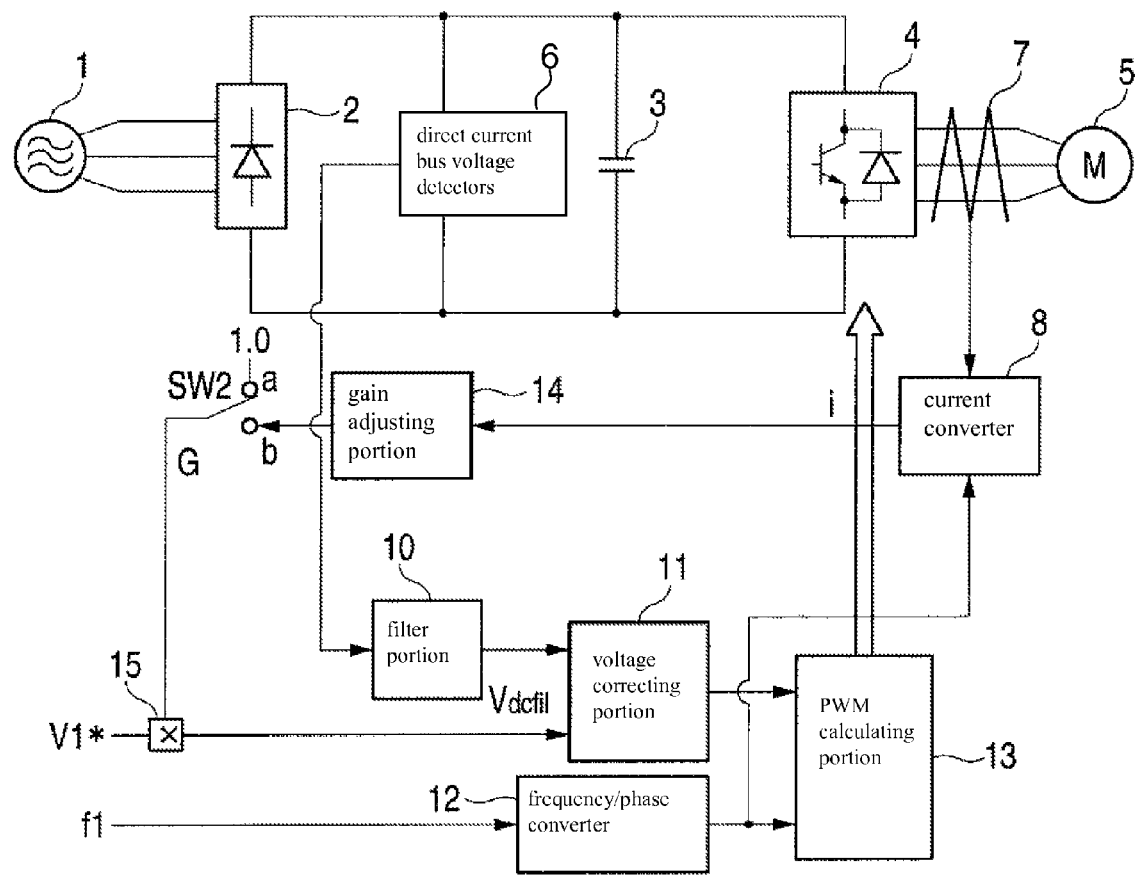
FIG. 3 is a block diagram of a second embodiment of an inverter apparatus applied with a method of the invention.
Figure 4:
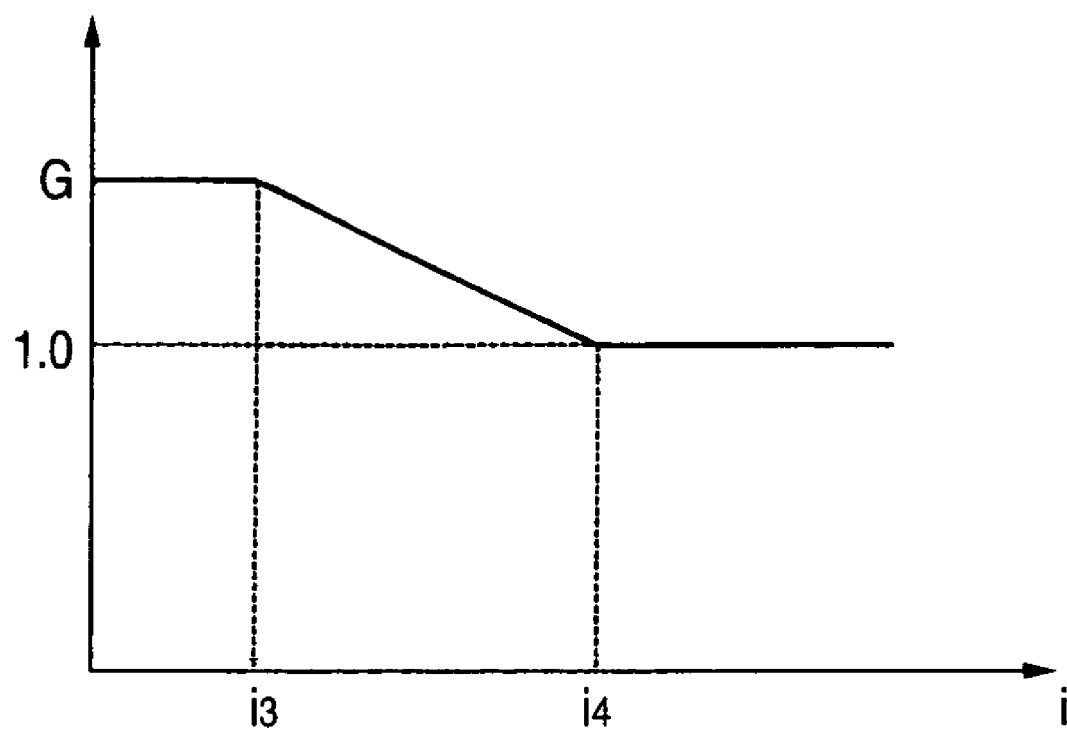
FIG. 4 shows an example of a gain adjusting portion.

FIG. 3 is a block diagram of a second embodiment of an inverter apparatus applied with a method of the invention, FIG. 4 shows an example of a gain adjusting portion. A control apparatus of an induction motor according to the embodiment includes the alternating current power source 1, the converter portion 2, the capacitor 3, the inverter portion 4, the alternating current motor 5, the direct current bus voltage detector 6, the current detector 7, the current converter 8, the filter portion 10, the voltage correcting portion 11, the frequency/phase converter 12, the PWM calculating portion 13, a gain adjusting portion 14, a multiplier 15 and a switch SW2. The converter portion 2 of the inverter apparatus rectifies the alternating current voltage of the alternating current power source 1 to thereby convert into the direct current voltage. The capacitor 3 makes the direct current voltage converted by the converter portion 2 smooth. The inverter portion 4 converts a direct current into an alternating current having arbitrary frequency and voltage by controlling the power element by the PWM control and supplies the alternating current motor 5 with the current. The direct current bus voltage detector 6 detects the direct current bus voltage $V_{dc}$ applied across the both ends of the capacitor 3. The current detector 7 detects the current supplied to the alternating current motor 5. The current converter 8 separates the current detected by the current detector 7 into the current i1 flowing in the alternating current motor and the torque current detected value iq and the exciting current detected value id. The filter portion 10 outputs the direct current bus voltage $V_{dc}$ obtained by detecting the time constant $T_{dc}$ by the direct current bus voltage detector 6 as the direct current bus voltage corrected value $V_{dcfil}$ constituted by passing the direct current bus voltage $V_{dc}$ through the first order lag filter having the time constant $T_{dc0}$. The gain adjusting portion 14 adjusts a gain G in accordance with a magnitude of a current flowing in the alternating current motor 5. The multiplier 15 multiplies the arbitrary voltage instruction V1* by the gain G and outputs a voltage instruction V1*' after having been adjusted. The voltage correcting portion 11 calculates the voltage instruction corrected value from the direct current bus voltage corrected value $V_{dcfil}$ such that the voltage instruction V1*' after having been adjusted and the output voltage of the inverter portion 4 coincide with each other. The frequency/phase converter 12 calculates the voltage phase by inputting the arbitrary output frequency f1. The PWM calculating portion 13 calculates a PWM signal from the voltage instruction corrected value from the voltage correcting portion 11 and the voltage phase from the frequency/phase converter 12. The power element of the inverter portion 4 is driven by the PWM signal outputted from the PWM calculating portion 13.

A specific explanation will be given of an operation in a case of shifting from the normal operating state to the decelerated state according to the invention. First, in the normal control state, SW2 is set to a side, the gain G is 1.0 and therefore, the motor is operated in a state in which the arbitrary voltage instruction V1* and the voltage instruction V1*' after having been adjusted coincide with each other. When a deceleration instruction is inputted, SW2 is switched to b side. At this occasion, the gain G is previously set and is set to a value larger than 1.0 within a range of 1.0 through 2.0 and therefore, the voltage instruction V1*' after having been adjusted is increased by an amount of the gain G relative to the arbitrary voltage instruction V1*. Thereby, as the instruction, the magnetic flux level of the alternating current motor 5 is increased by the amount of the gain G to be brought into the overexcited state and therefore, iron loss, copper loss or the like at the alternating current motor 5 is increased and therefore, the regenerated power returned to the side of the inverter apparatus is reduced, the inverter apparatus is made to be difficult to be brought into the overvoltage state, and the decelerating time period can be made to be shorter than that of the normal magnetic flux level.

On the other hand, in recent years, the alternating current motor 5 which is easy to be saturated magnetically is increased, even when the motor is intended to be brought into the overexcited state, the motor is saturated magnetically, only the current flows and the magnetic flux is not increased further. When the inverter apparatus of the conventional art 1 is applied to the alternating current motor 5 which is easy to be saturated magnetically, an excessively large current flows in the alternating current motor 5 when the alternating current motor 5 is saturated magnetically since the motor terminal voltage is increased by the gain G in deceleration, and there is a possibility that the inverter apparatus becomes abnormal by the overcurrent, or the alternating current motor 5 is burned by the current. Hence, according to the invention, as shown by FIG. 4, in accordance with a current i1 flowing in the alternating current motor 5, the gain is made to be larger than 1.0 which is previously set until the i1 becomes $i1_3$, the gain is reduced gradually when the current i1 exceeds $i1_3$, the current is returned to 1.0 when $i1_4$ is reached to thereby return the motor from the overexcited state to the normal magnetic flux state. The deceleration time period can be shortened without a concern of the abnormal overcurrent of the inverter apparatus or burning the alternating current motor 5 even in the alternating current motor which is easy to be saturated magnetically by previously setting $i1_3$ or $i1_4$ from a characteristic of the inverter apparatus and a characteristic of the alternating current motor. Further, even when the gain is not adjusted in accordance with the current i1 flowing in the alternating current motor 5 but the gain is adjusted in accordance with the torque current detected value iq or the exciting current detected value id, a similar effect is achieved.

Embodiment 3

Figure 5:
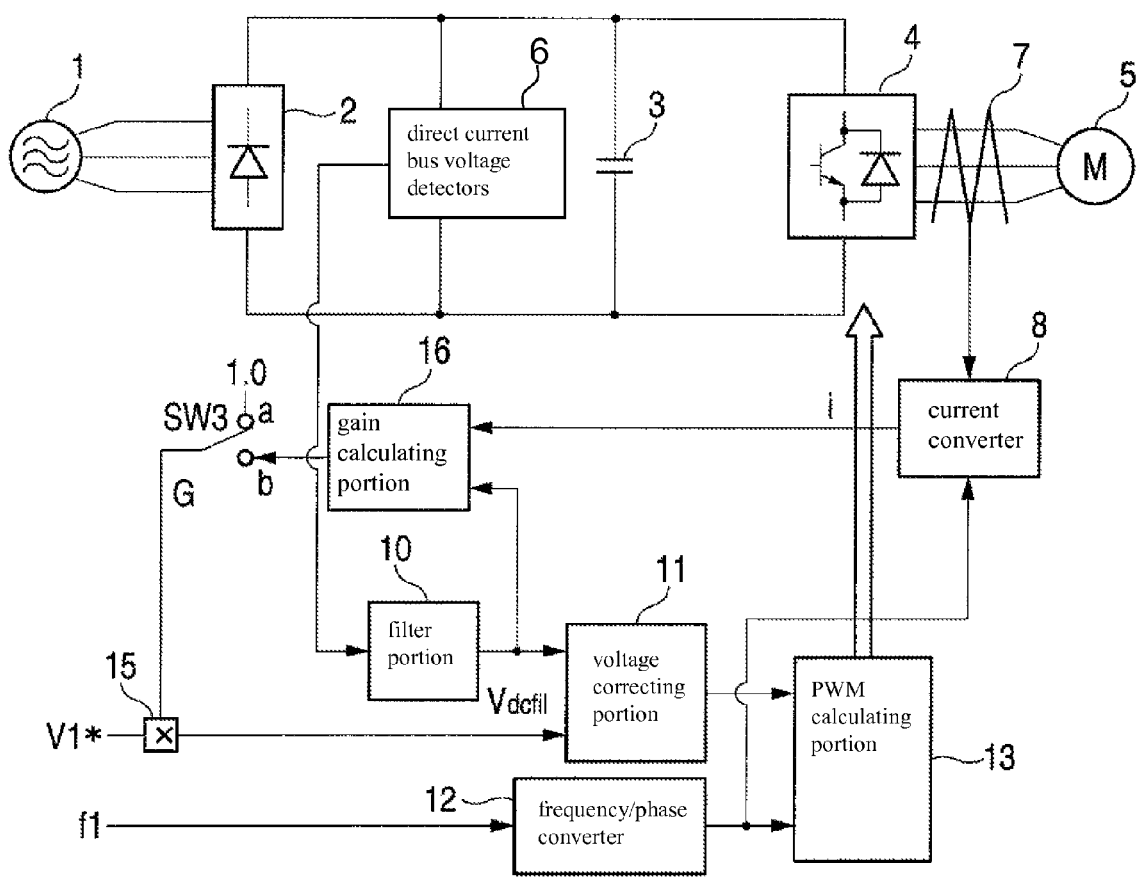
FIG. 5 is a block diagram of a third embodiment of an inverter apparatus applied with a method of the invention.
Figure 6:
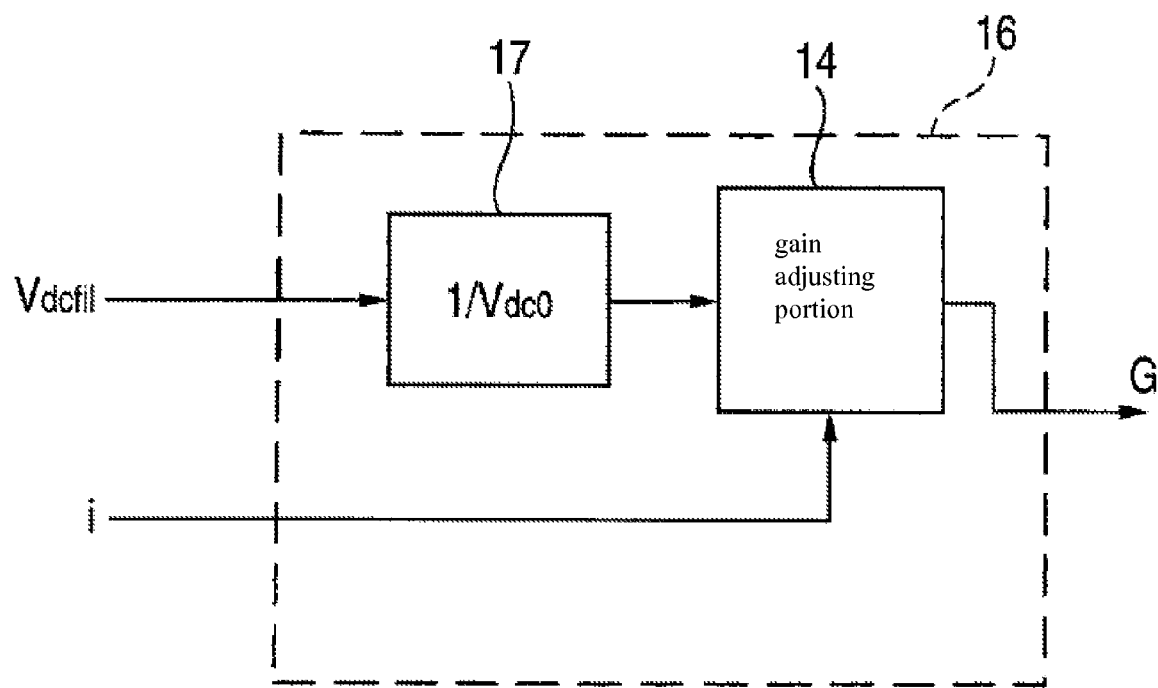
FIG. 6 is a block diagram of a gain calculator.

FIG. 5 is a block diagram of a third embodiment of an inverter apparatus applied with a method of the invention, FIG. 6 is a block diagram of a gain calculator. A control apparatus of an induction motor according to the embodiment includes the alternating current power source 1, the converter portion 2, the capacitor 3, the inverter portion 4, the alternating current motor 5, the direct current bus voltage detector 6, the current detector 7, the current converter 8, the filter portion 10, the voltage correcting portion 11, the frequency/phase converter 12, the PWM calculating portion 13, a gain calculator 16, the multiplier 15 and a switch SW3. The converter portion 2 of the inverter apparatus rectifies the alternating current voltage of the alternating current power source 1 to thereby convert into the direct current voltage. The capacitor 3 makes the direct current voltage converted by the converter portion 2 smooth. The inverter portion 4 converts a direct current into an alternating current having arbitrary frequency and voltage by controlling the power element by the PWM control to supply to the alternating current motor 5. The direct current bus voltage detector 6 detects the direct current bus voltage $V_{dc}$ applied across the both ends of the capacitor 3. The current detector 7 detects the current supplied to the alternating current motor 5. The current converter 8 separates the current detected by the current detector 7 into the current i1 flowing in the alternating current motor and the torque current detected value iq and the exciting current detected value id. The filter portion 10 outputs the direct current bus voltage $V_{dc}$ obtained by detecting the time constant $T_{dc}$ by the direct current bus voltage detector 6 as the direct current bus voltage corrected value $V_{dcfil}$ constituted by passing the direct current bus voltage $V_{dc}$ through the first delay filter having the time constant $T_{dc0}$. As shown by FIG. 6, the gain calculator 16 is constituted by the gain adjusting portion 14 and a direct bus voltage standardizing portion 17 for determining the gain G by standardizing the direct current bus voltage corrected value $V_{dcfil}$ outputted by the filter portion 10 relative to a direct current bus voltage standard value $V_{dc0}$ by the direct current bus voltage standardizing portion 17. With regard to the gain G, the gain G is adjusted in accordance with the magnitude of the current flowing in the alternating current motor 5 as shown by FIG. 4. The multiplier 15 multiplies the arbitrary voltage instruction V1* by the gain G and outputs the voltage instruction V1*' after having been adjusted. The voltage correcting portion 11 calculates the voltage instruction corrected value from the direct current bus voltage corrected value $V_{dcfil}$ such that the voltage instruction V1*' after having been adjusted and the output voltage of the inverter portion 4 coincide with each other. The frequency/phase converter 12 inputs the arbitrary output frequency f1 and calculates the voltage phase. The PWM calculating portion 13 calculates the PWM signal from the voltage instruction corrected value from the voltage correcting portion 11 and the voltage phase from the frequency/phase converter 12. The power element of the inverter portion 4 is driven by the PWM signal outputted from the PWM calculating portion 13.

A specific explanation will be given of an operation when the motor is shifted from the normal operating state to the decelerating state according to the invention. First, in the normal control state, SW3 is set to a side, the gain G is 1.0 and therefore, the motor is operated in a state in which the arbitrary voltage instruction V1* and the voltage instruction V1*' after having been adjusted coincide with each other. When a deceleration instruction is inputted, SW3 is switched to b side. At this occasion, the gain G becomes a value within a range of 1.0 through 1.5 in accordance with the direct current bus voltage corrected value $V_{dcfil}$, the larger the direct current bus voltage by decelerating the motor, the more the gain G becomes the value larger than 1.0 and therefore, the voltage instruction V1*' after having been adjusted becomes larger than the arbitrary voltage instruction V1*. Thereby, the alternating current motor 5 is brought into the overexcited state and therefore, iron loss, copper loss or the like at the alternating current motor 5 is increased and therefore, the regenerating power returning to the side of the inverter apparatus is reduced, the inverter apparatus is made to be difficult to be brought into the overvoltage state, and the decelerating time period can be made to be shorter than that of the normal magnetic flux level.

On the other hand, in recent years, the alternating current motor 5 which is easy to be saturated magnetically is increased, even when the motor is intended to be brought into the overexcited state, the motor is saturated magnetically, only the current flows and the magnetic flux is not increased further. According to the invention, as shown by FIG. 4, in accordance with the current i1 flowing in the alternating current motor 5, the gain is set to the value larger than 1.0 which is previously set until the i1 becomes $i1_3$, when the current exceeds $i1_3$, the gain is gradually reduced, and when $i1_4$ is reached, the gain is returned to 1.0 to thereby return the motor from the overexcited state to the normal magnetic flux state. By previously setting $i1_3$ and $i1_4$ from the characteristic of the inverter apparatus and the characteristic of the alternating current motor, even in the case of the alternating current motor which is easy to be saturated magnetically, the deceleration time period can be shortened without a concern of the abnormal overcurrent of the inverter apparatus or burning the alternating current motor 5. Further, even when the gain is not adjusted in accordance with the current i1 flowing in the alternating current motor 5 but the gain is adjusted in accordance with the torque current detected value iq or the exciting current detected value id, a similar effect is achieved.

Embodiment 4

Figure 7:
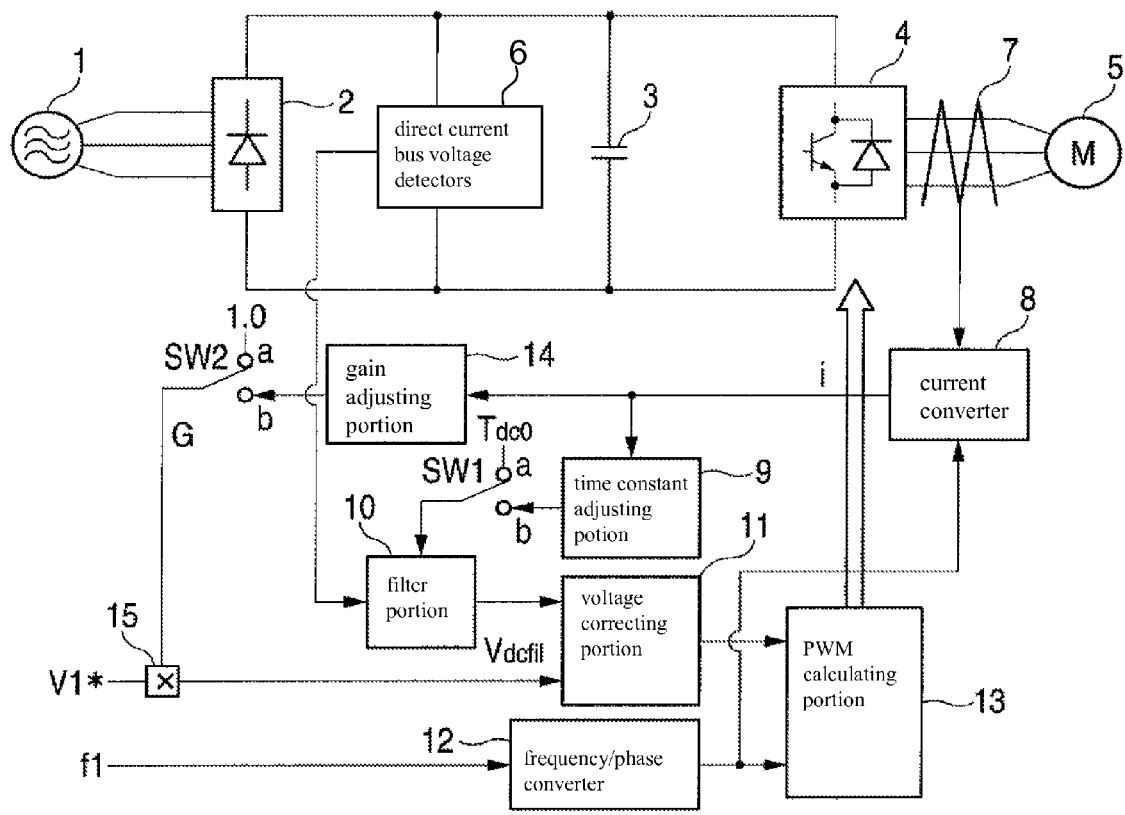
FIG. 7 is a block diagram of a fourth embodiment of an inverter apparatus applied with a method of the invention.

FIG. 7 is a block diagram of a fourth embodiment of an inverter apparatus applied with a method of the invention. A control apparatus of an induction motor according to the embodiment includes the alternating current power source 1, the converter portion 2, the capacitor 3, the inverter portion 4, the alternating current motor 5, the direct current bus voltage detector 6, the current detector 7, the current converter 8, the time constant adjusting portion 9, the filter portion 10, the voltage correcting portion 11, the frequency/phase converter 12, the PWM calculating portion 13, the gain adjusting portion 14, the multiplier 15 and the switches SW1, SW2. The converter portion 2 of the inverter apparatus rectifies the alternating current voltage of the alternating current power source 1 to thereby convert into the direct current voltage. The capacitor 3 makes the direct current voltage converted by the converter portion 2 smooth. The inverter portion 4 converts a direct current into an alternating current having arbitrary frequency and voltage by controlling the power element by the PWM control to be supplied to the alternating current motor 5. The direct current bus voltage detector 6 detects the direct current bus voltage $V_{dc}$ applied across the both ends of the capacitor 3. The current detector 7 detects the current supplied to the alternating current motor 5. The current converter 8 separates the current detected by the current detector 7 into the current i1 flowing in the alternating current motor and the torque current detected value iq and the exciting current detected value id. The time constant adjusting portion 9 adjusts the time constant $T_{dc}$ used in the filter portion 10 in accordance with the magnitude of the current flowing in the alternating current motor 5. The filter portion 10 outputs the direct current bus voltage $V_{dc}$ detected by the direct current bus voltage detector 6 as a direct current bus voltage corrected value $V_{dcfil}$' constituted by passing the direct current bus voltage $V_{dc}$ through the first order lag filter having the time constant $T_{dc}$. The gain adjusting portion 14 adjusts the gain G in accordance with the magnitude of the current flowing in the alternating current motor 5. The multiplier 15 multiplies the arbitrary voltage instruction V1* by the gain G and outputs the voltage instruction V1*' after having been adjusted. The voltage correcting portion 11 calculates the voltage instruction corrected value from the direct current bus voltage corrected value $V_{dcfil}$ such that the voltage instruction V1*' after having been adjusted and the output voltage of the inverter portion 4 coincide with each other. The frequency/phase converter 12 inputs the arbitrary output frequency f1 to calculate the voltage phase. The PWM calculating portion 13 calculates the PWM signal from the voltage instruction corrected value from the voltage correcting portion 11 and the voltage phase from the frequency/phase converter 12. The power element of the inverter portion 4 is driven by the PWM signal outputted from the PWM calculating portion 13.

A specific explanation will be given of an operation when the motor is shifted from the normal operating state to the decelerated state according to the invention. First, in the normal control state, SW2 is set to a side, the gain G is 1.0 and therefore, the arbitrary voltage instruction V1* and the voltage instruction V1*' after having been adjusted coincide with each other, at the same time, SW1 is set to a side, and the motor is operated by the previously set filter time constant $T_{dc0}$ and therefore, the output voltage of the inverter portion 4 coincides with the voltage instruction value V1*. When the deceleration instruction is inputted, SW1 and SW2 are switched to the b sides. AT this occasion, the gain G is previously set and set to a value larger than 1.0 within a range of 1.0 through 2.0 and therefore, the voltage instruction V1*' after having been adjusted becomes larger than the arbitrary voltage instruction V1* by an amount of the gain G. Further, the filter time constant becomes the time constant $T_{dc1}$ far longer than $T_{dc0}$ by a multiplication factor of about 10 through 10000. Therefore, during the deceleration, the direct current bus voltage corrected value $V_{dcfil}$ outputted by the filter portion 10 is maintained to a value thereof in starting deceleration. Actually, by decelerating the motor, the direct current bus voltage is increased and therefore, the voltage correcting portion 11 is not operated correctly and calculates the voltage instruction corrected value to output the output voltage large than the voltage instruction V1*' after having been adjusted. Thereby, the alternating current motor 5 is brought into the overexcited state and therefore, iron loss, copper loss or the like at the alternating current motor 5 is increased and therefore, the regenerating power returning to the side of the inverter apparatus is reduced, the inverter apparatus is made to be difficult to be brought into the overvoltage state, and the decelerated time period can be made to be shorter than that at the normal magnetic flux level. When a time period has elapsed to some degree after starting deceleration, the direct current bus voltage corrected value $V_{dcfil}$ outputted by the filter portion 10 gradually approaches the true value and therefore, the voltage correcting portion 11 is gradually operated correctly.

On the other hand, in recent years, the alternating current motor 5 which is easy to be saturated magnetically is increased, even when the motor is intended to be brought into the overexcited state, the motor is saturated magnetically, only the current flows and the magnetic flux is not increased further. Hence, according to the invention, as shown by FIG. 2, in accordance with the current i1 flowing in the alternating current motor 5, until the i1 becomes $i1_1$, the filter time constant $T_G$, is set to $T_{dc1}$ far longer than the normal filter time constant $T_{dc0}$ by a multiplication factor of about 10 through 10000, when the current exceeds $i1_1$, the filter time constant is gradually shortened, when $i1_2$ is reached, the time constant is returned to the normal time constant $T_{dc0}$ to thereby make the direct current bus voltage corrected value $V_{dcfil}$ swiftly proximate to the true value and therefore, the motor is returned from the overexcited state to the normal magnetic flux state. By previously setting $i1_1$ and $i1_2$ from the characteristic of the inverter apparatus and the characteristic of the alternating current motor, even in the case of the alternating current motor which is easy to be saturated magnetically, the decelerating time period can be shortened without a concern of the abnormal overcurrent of the inverter apparatus or burning the alternating current motor 5. Further, even when the filter time constant is not adjusted in accordance with the current i1 flowing in the alternating current motor 5 but the filter time constant is adjusted in accordance with the torque current detected value iq or the exciting current detected value id, a similar effect is achieved. Or, as shown by FIG. 4, in accordance with a current i1 flowing in the alternating current motor 5, the gain is set to the value larger than 1.0 which is previously set until i1 becomes $i1_2$, when the current exceeds $i1_3$, the gain is gradually reduced, and when $i1_4$ is reached, the gain is returned to 1.0 to thereby return the motor from the overexcited state to the normal magnetic flux state. By previously setting $i1_3$ and $i1_4$ from the characteristic of the inverter apparatus and the characteristic of the alternating current motor, even in the case of the alternating current motor which is easy to be saturated magnetically, the decelerating time period can be shortened without a concern of the abnormal overcurrent of the inverter apparatus or burning the alternating current motor 5. Further, when the gain is not adjusted in accordance with the current i1 flowing in the alternating current motor 5 but the gain is adjusted in accordance with the torque current detected value iq or the exciting current detected value id, a similar effect is achieved. Further, a similar effect is achieved even by adjusting the gain simultaneously with adjusting the filter time constant in accordance with the current i1 flowing in the alternating current motor 5. Or, a similar effect is achieved not by adjusting the gain simultaneously adjusting the filter time constant in accordance with the current i1 flowing in the alternating current motor 5 but by adjusting the gain simultaneously with adjusting the filter time constant in accordance with the torque current detected value iq or the exciting current detected value id.

Embodiment 5

Figure 8:
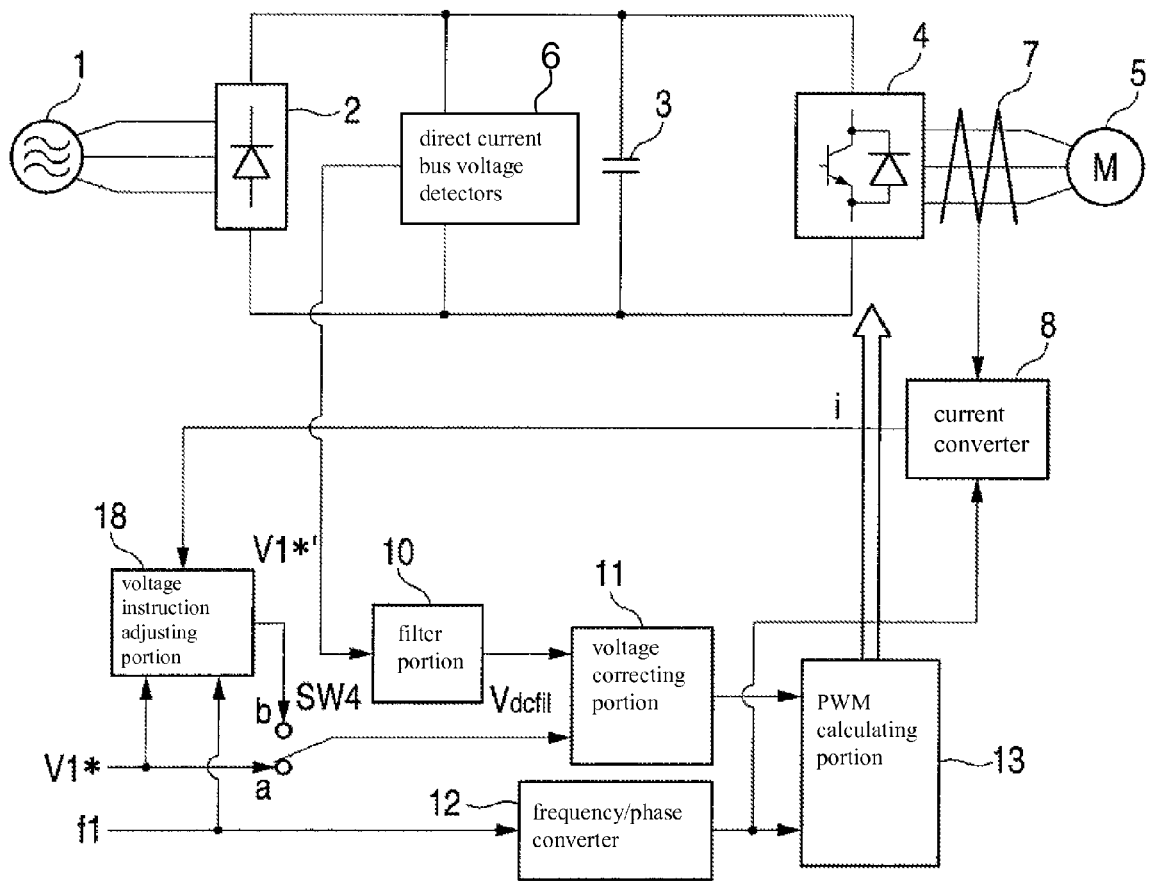
FIG. 8 is a block diagram of a fifth embodiment of an inverter apparatus applied with a method of the invention.
Figure 9:
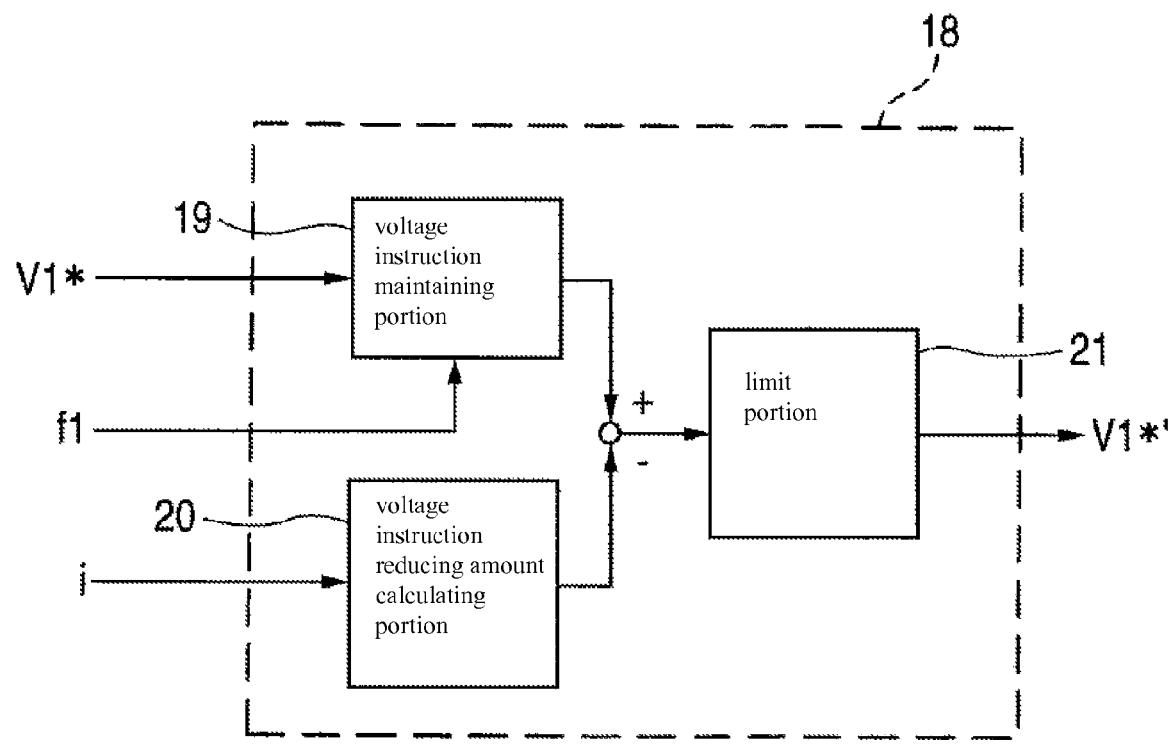
FIG. 9 is a block diagram of a voltage instruction adjusting portion.
Figure 10:
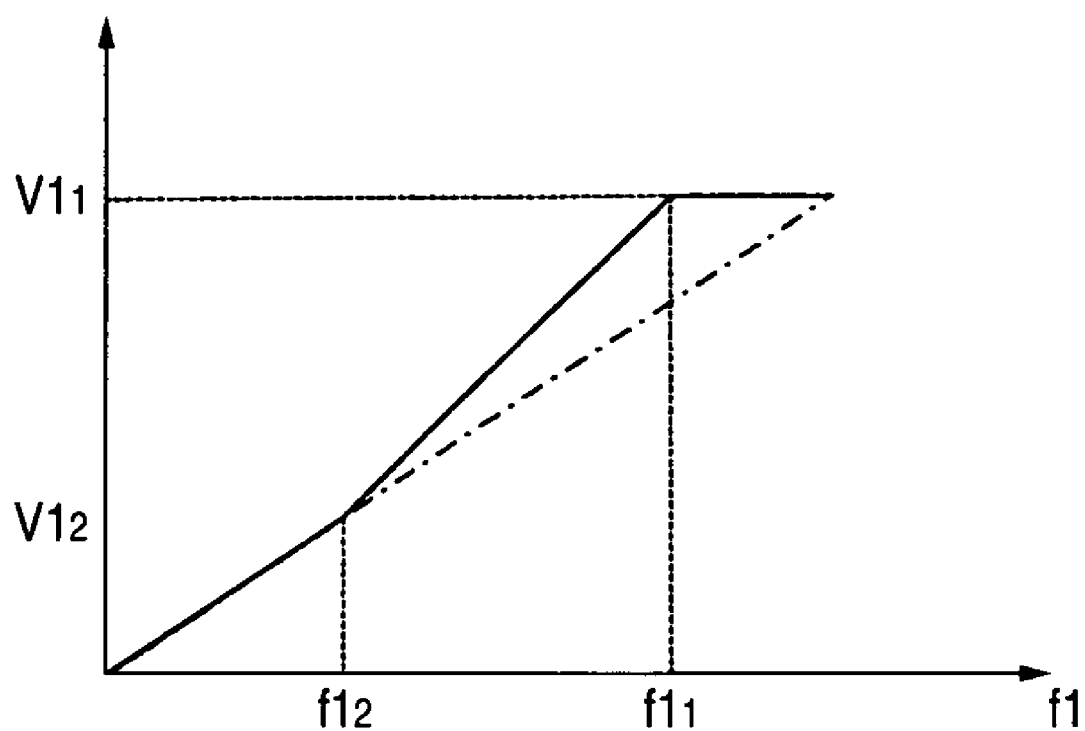
FIG. 10 shows an example of a voltage instruction maintaining portion.
Figure 11:
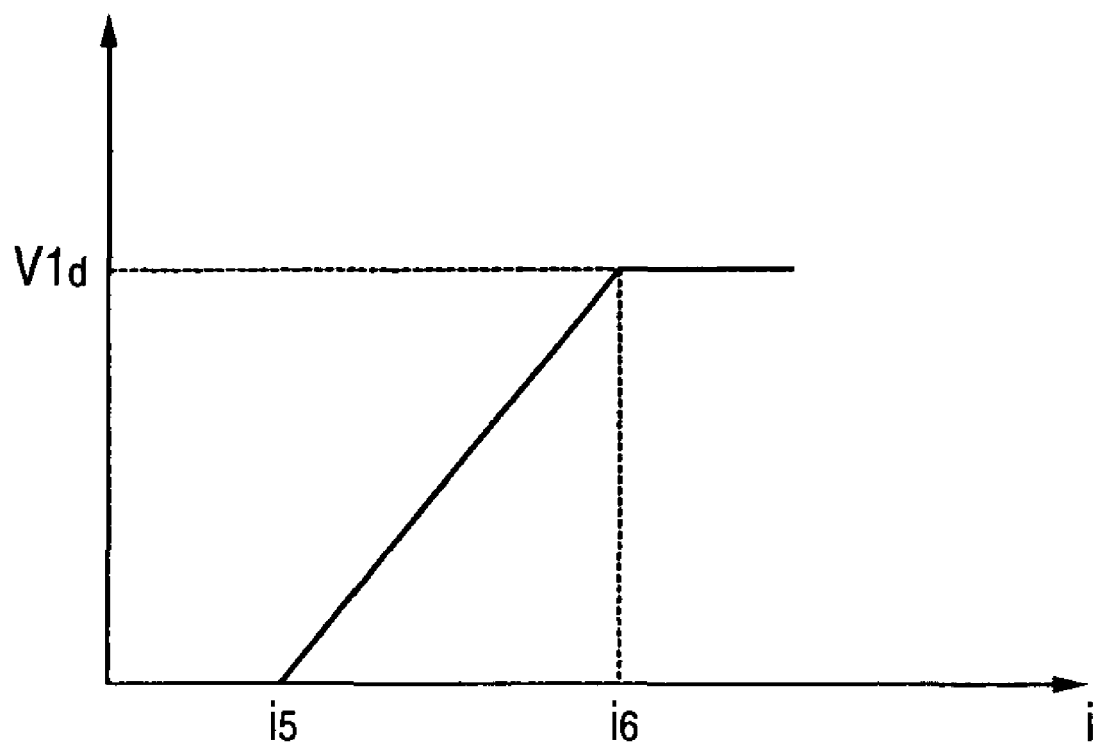
FIG. 11 shows an example of a voltage instruction reducing amount calculating portion.

FIG. 8 is a block diagram of a fifth embodiment of an inverter apparatus applied with a method of the invention, FIG. 9 is a block diagram of a voltage instruction adjusting portion, FIG. 10 shows an example of a voltage instruction maintaining portion, and FIG. 11 shows an example of a voltage instruction reducing amount calculating portion. A control apparatus of an induction motor according to the embodiment includes the alternating current power source 1, the converter portion 2, the capacitor 3, the inverter portion 4, the alternating current motor 5, the direct current bus voltage detector 6, the current detector 7, the current converter 8, the filter portion 10, the voltage correcting portion 11, the frequency/phase converter 12, the PWM calculating portion 13, a voltage instruction adjusting portion 18 and a switch SW4. The converter portion 2 of the inverter apparatus rectifies the alternating current voltage of the alternating current power source 1 to thereby convert into the direct current voltage. The capacitor 3 makes the direct current voltage converted by the converter portion 2 smooth. The inverter portion 4 converts a direct current into an alternating current having arbitrary frequency and voltage by controlling the power element by the PWM control to supply to the alternating current motor 5. The direct current bus voltage detector 6 detects the direct current bus voltage $V_{dc}$ applied across the both ends of the capacitor 3. The current detector 7 detects the current supplied to the alternating current motor 5. The current converter 8 separates the current detected by the current detector 7 into the current i1 flowing in the alternating current motor and the torque current detected value iq and the exciting current detected value id. The filter portion 10 outputs the direct current bus voltage $V_{dc}$ obtained by detecting the time constant $T_{dc}$ by the direct current bus voltage detector 6 as the direct current bus voltage corrected value $V_{dcfil}$ constituted by passing the direct current bus voltage $V_{dc}$ through the first delay filter having the time constant $T_{dc0}$. The voltage instruction adjusting portion 18 outputs the voltage instruction V1*' after having been adjusted in accordance with the arbitrary voltage instruction V1* and the arbitrary output frequency f1 and the magnitude of the current flowing in the direct current motor 5 as shown by FIG. 9. The voltage correcting portion 11 calculates the voltage instruction corrected value from the direct current bus voltage corrected value $V_{dcfil}$ such that the arbitrary voltage instruction V1* or the voltage instruction V1*' after having been adjusted and the output voltage of the inverter portion 4 coincide with each other. The frequency/phase converter 12 calculates the voltage phase by inputting the arbitrary output frequency f1. The PWM calculating portion 13 calculates the PWM signal from the voltage instruction corrected value from the voltage correcting portion 11 and the voltage phase from the frequency/phase converter 12.

The power element of the inverter portion 4 is driven by the PWM signal outputted from the PWM calculating portion 13.

A specific explanation will be given of an operation when the motor is shifted from the normal operating state to the decelerated state according to the invention. First, in the normal control state, SW4 is set to a side, the voltage instruction inputted to the voltage correcting portion 11 is operated by the arbitrary voltage instruction V1*. When the deceleration instruction is inputted, SW4 is switched to b side. At this occasion, the voltage instruction inputted to the voltage correcting portion 11 becomes the voltage instruction V1*' after having been adjusted outputted by the voltage instruction adjusting portion 18. According to the operation of the voltage instruction adjusting portion 18, as shown by FIG. 10, when the frequency is higher than a previously set $f1_1$, a voltage instruction when deceleration is started is maintained by a voltage instruction maintaining portion 19, when the motor is decelerated from $f1_1$, a ratio of a frequency to a voltage is gradually made to be proximate to a normal ratio indicated by a one-dotted broken line, further, when the motor is decelerated from $f1_2$, the voltage instruction V1*' after having been adjusted constituting the normal ratio of the voltage to the frequency is outputted. Although an explanation has been given such that according to the example, frequencies $f1_1$, $f1_2$ are previously set, the frequencies may be determined in the form of rates to the current output frequency. Thereby, the voltage instruction V1*' after having been adjusted becomes larger the arbitrary voltage instruction V1* until the motor is decelerated to $f1_2$ after starting the deceleration. Thereby, the alternating current motor 5 is brought into the overexcited state and therefore, iron loss, copper loss or the like at the alternating current motor 5 is increased and therefore, the regenerating power returning to the side of the inverter apparatus is reduced, the inverter apparatus is made to be difficult to be brought into the overvoltage state, and the decelerating time period can be made to be shorter than that of the normal magnetic flux level.

On the other hand, in recent years, the alternating current motor 5 which is easy to be saturated magnetically is increased, even when the motor is intended to be brought into the overexcited state, the motor is saturated magnetically, only the current flows and the magnetic flux is not increased further. Hence, according to the invention, as shown by FIG. 11, in accordance with the current i1 flowing in the alternating current motor 5, a voltage instruction reducing amount calculating portion 20 does not take any action as a dead zone until i1 becomes $i1_5$, however, outputs a large voltage instruction reducing amount $V1_d$ gradually in accordance with i1 when i1 exceeds $i1_5$, and outputs a fixed voltage instruction reducing amount $V1_d$ when i1 exceeds $i1_6$. A value constituted by subtracting the voltage instruction reducing amount calculating portion 20 from the output of the voltage instruction maintaining portion 19 is restricted by a limit portion 21 by a value of a one-dotted broken line of FIG. 10 in accordance with the frequency f1 and is outputted as the voltage instruction V1*' after having been adjusted. The motor is retuned from the overexcited state to the normal magnetic flux state by adjusting the output of the voltage instruction maintaining portion 19 by the voltage instruction reducing amount calculating portion 20 in accordance with a magnitude of the current. By previously setting $i1_5$ and $i1_6$ from the characteristic of the inverter apparatus and the characteristic of the alternating current motor, even in the case of the alternating current motor which is easy to be saturated magnetically, the decelerating time period can be shortened without a concern of the abnormal overcurrent of the inverter apparatus or burning the alternating current motor 5. Further, a similar effect is achieved not by adjusting a rate of the voltage instruction to the frequency in accordance with the current i1 flowing in the alternating current motor 5 but by adjusting the rate of the voltage instruction to the frequency in accordance with the torque current detected value iq or the exciting current detected value id.

Embodiment 6

Figure 12:
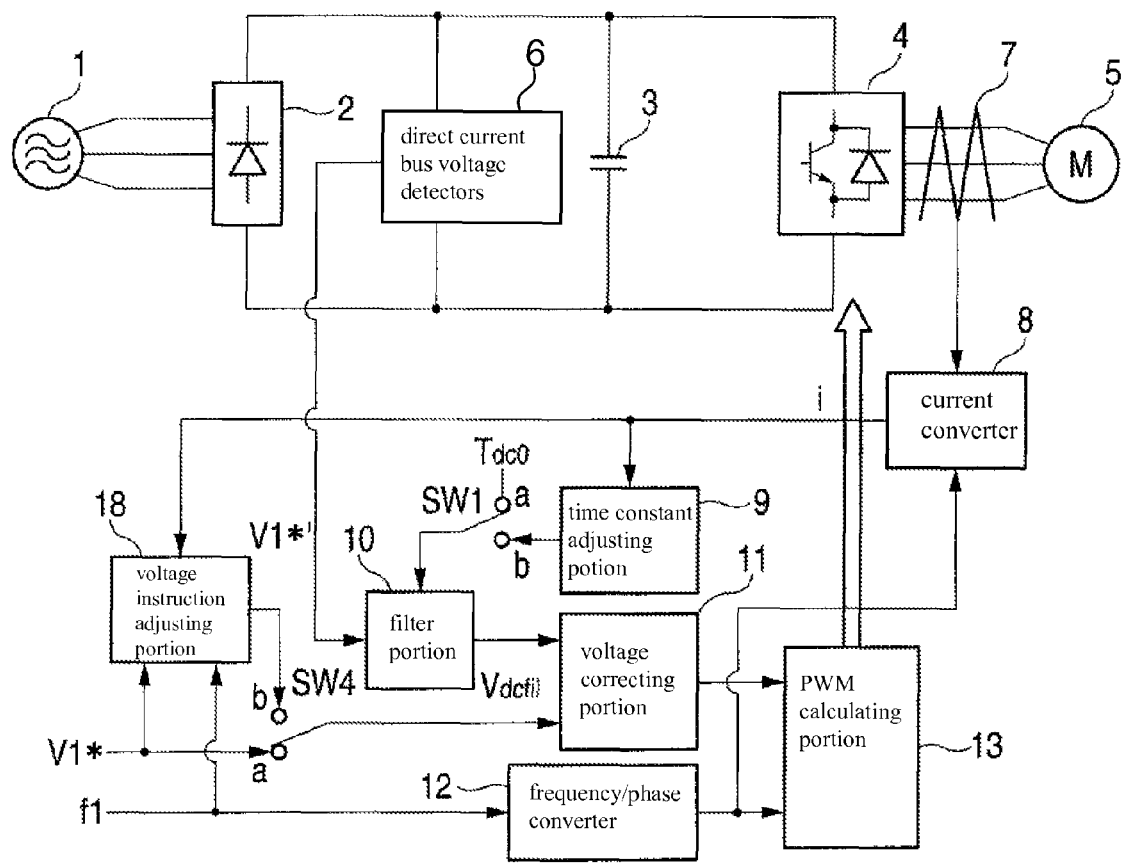
FIG. 12 is a block diagram of a sixth embodiment of an inverter apparatus applied with a method of the invention.
Figure 13:
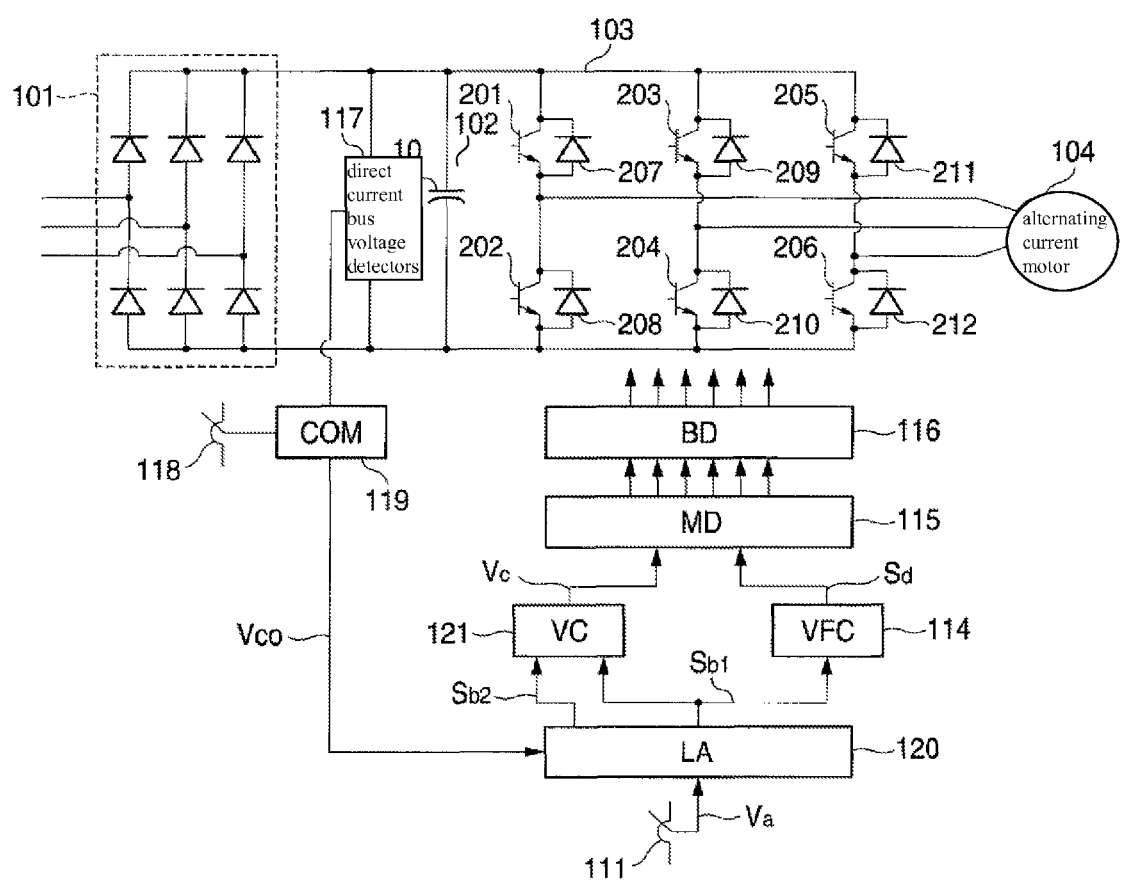
FIG. 13 is a block diagram of a first embodiment of an inverter apparatus of a conventional art.
Figure 14:
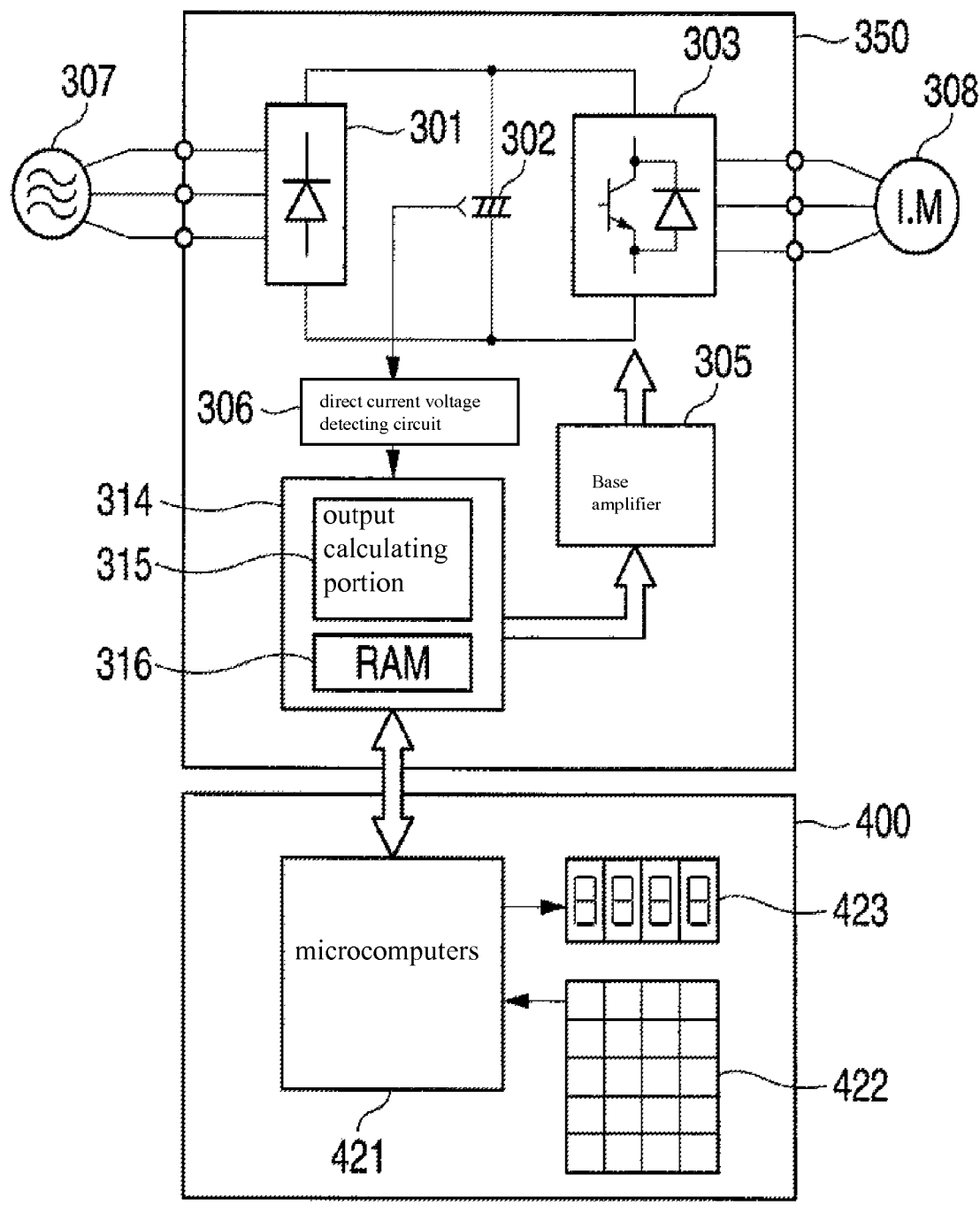
FIG. 14 is a block diagram of a second embodiment of an inverter apparatus of a conventional art.
Figure 15:
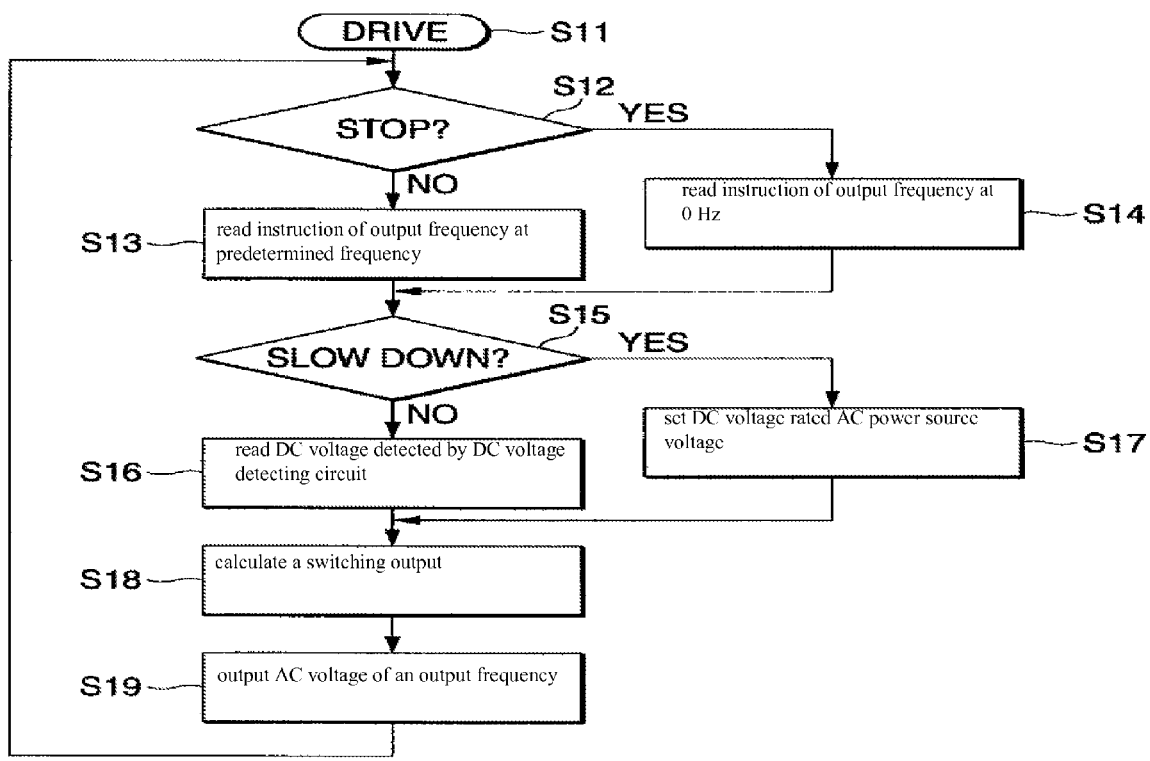
FIG. 15 is a flowchart in operating the second embodiment of the inverter apparatus of the conventional art.

FIG. 12 is a block diagram of a sixth embodiment of an inverter apparatus applied with a method of the invention. A control apparatus of an induction motor according to the embodiment includes the alternating current power source 1, the converter portion 2, the capacitor 3, the inverter portion 4, the alternating current motor 5, the direct current bus voltage detector 6, the current detector 7, the current converter 8, the time constant adjusting portion 9, the filter portion 10, the voltage correcting portion 11, the frequency/phase converter 12, the PWM calculating portion 13, the voltage instruction adjusting portion 18 and switches SW1, SW4. The converter portion 2 of the inverter apparatus rectifies the alternating current voltage of the alternating current power source 1 to thereby convert into the direct current voltage. The capacitor 3 makes the direct current voltage converted by the converter portion 2 smooth. The inverter portion 4 converts a direct current into an alternating current having arbitrary frequency and voltage by controlling the power element by the PWM control to be supplied to the alternating current motor 5. The direct current bus voltage detector 6 detects the direct current bus voltage $V_{dc}$ applied across the both ends of the capacitor 3. The current detector 7 detects the current supplied to the alternating current motor 5. The current converter 8 separates the current detected by the current detector 7 into the current i1 flowing in the alternating current motor and the torque current detected value iq and the exciting current detected value id. The time constant adjusting portion 9 adjusts the time constant $T_{dc}$ used in the filter portion 10 in accordance with the magnitude of the current flowing in the alternating current motor 5. The filter portion 10 outputs the direct current bus voltage $V_{dc}$ detected by the direct current bus voltage detector 6 as the direct current bus voltage corrected value $V_{dcfil}$ constituted by passing the direct current bus voltage $V_{dc}$ through the first order lag filter having the time constant $T_{dc}$. As shown by FIG. 9, the voltage instruction adjusting portion 18 outputs the voltage instruction V1*' after having been adjusted in accordance with the arbitrary voltage instruction V1* and the arbitrary output frequency f1 and the magnitude of the current flowing in the alternating current motor 5. The voltage correcting portion 11 calculates the voltage instruction corrected value from the direct current bus voltage corrected value $V_{dcfil}$ such that the arbitrary voltage instruction V1* or the voltage instruction V1*' after having been adjusted and the output voltage of the inverter portion 4 coincide with each other. The frequency/phase converter 12 inputs the arbitrary output frequency f1 and calculates the voltage phase. The PWM calculating portion 13 calculates the PWM signal from the voltage instruction corrected value from the voltage correcting portion 11 and the voltage phase from the frequency/phase converter 12. The power element of the inverter portion 4 is driven by the PWM signal outputted from the PWM calculating portion 13.

A specific explanation will be given of an operation when the motor is shifted from the normal operating state to the decelerated state according to the invention. First, in the normal control state, SW4 is set to a side, simultaneously constituting the voltage instruction inputted to the voltage correcting portion 11 by the arbitrary voltage instruction V1*, SW1 is set to a side, the motor is operated by the previously set filter time constant $T_{dc0}$ and therefore, the output voltage of the inverter portion 4 coincides with the voltage instruction value V1*. When the deceleration instruction is inputted, SW1 and SW4 are switched to b sides. At this occasion, the voltage instruction inputted to the voltage correcting portion 11 becomes the voltage instruction V1*' after having been adjusted outputted by the voltage instruction adjusting portion 18. According to the operation of the voltage instruction adjusting portion 18, as shown by FIG. 10, when the frequency is higher than f1₁ which is previously set at the voltage instruction maintaining portion 19, in a case in which the motor is decelerated from f1₁ while maintaining the voltage instruction when deceleration is started, the ratio of the frequency to the voltage becomes proximate to the normal ratio as shown by the one-dotted broken line, further, when the motor is decelerated from f1₂, the voltage instruction V1*' after having been adjusted constituting the normal ratio of the voltage to the frequency is outputted. Further, the filter time constant becomes the time constant $T_{dc1}$ far longer than $T_{dc0}$ by a multiplication factor of about 10 through 10000. Therefore, during the deceleration, the direct current bus voltage corrected value $V_{dcfil}$ outputted by the filter portion 10 is maintained to a value thereof in starting deceleration. Actually, the direct current bus voltage is increased by decelerating the motor and therefore, the voltage correcting portion 11 is not operated correctly and calculates the voltage instruction corrected value to output the output voltage larger than the voltage instruction V1*' after having been adjusted. Thereby, the alternating current motor 5 is brought into the overexcited state and therefore, iron loss, copper loss or the like at the alternating current motor 5 is increased and therefore, the regenerating power returning to the side of the inverter apparatus is reduced, the inverter apparatus is made to be difficult to be brought into the overvoltage state, and the decelerated time period can be made to be shorter than that of the normal magnetic flux level.

On the other hand, in recent years, the alternating current motor 5 which is easy to be saturated magnetically is increased, even when the motor is intended to be brought into the overexcited state, the motor is saturated magnetically, only the current flows and the magnetic flux is not increased further. Hence, according to the invention, as shown by FIG. 2, in accordance with the current i1 flowing in the alternating current motor 5, until the i1 becomes i1₁, the filter time constant $T_{dc}$ is set to $T_{dc1}$ far longer than the normal filter time constant $T_{dc0}$ by a multiplication factor of about 10 through 10000, when the i1 exceeds i1₁, the filter time constant is gradually shortened, when i1₂ is reached, the filter time constant $T_{dc}$ is returned to the normal filter time constant $T_{dc0}$, thereby, the direct current bus voltage corrected value $V_{dcfil}$ swiftly approaches the true value and therefore, the motor is returned from the overexcited state to the normal magnetic flux state. By previously setting i1₁ and i1₁ from the characteristic of the inverter apparatus and the characteristic of the alternating current motor, even in the case of the alternating current motor which is easy to be saturated magnetically, the decelerating time period can be shortened without a concern of the abnormal overcurrent of the inverter apparatus or burning the alternating current motor 5. Further, even when the filter time constant is not adjusted in accordance with the current i1 flowing in the alternating current motor 5 but the filter time constant is adjusted in accordance with the torque current detected value iq or the exciting current detected value id, a similar effect is achieved. Further, a similar effect is achieved by returning the motor from the overexcited state to the normal magnetic flux state by adjusting the output of the voltage instruction maintaining portion 19 by the voltage instruction reducing amount calculating portion 20 in accordance with the current i1 flowing in the alternating current motor 5. Further, a similar effect is achieved even not by adjusting the rate of the voltage instruction to the frequency in accordance with the current i1 flowing in the alternating current motor 5 but by adjusting the rate of the voltage instruction to the frequency in accordance with the torque detected value iq or the exciting current detected value id. Further, a similar effect is achieved even by adjusting the filter time constant simultaneously with adjusting the rate of the voltage instruction to the frequency in accordance with the current i1 flowing in the alternating current motor 5. Further, a similar effect is achieved even by adjusting the filter time constant simultaneously with the rate of the voltage instruction to the frequency in accordance with the torque current detected value iq or the exciting current detected value id.

INDUSTRIAL APPLICABILITY

Although according to the invention, an explanation has been given of the example of the inverter apparatus for converting the alternating current power source to the direct current by the converter portion, even in a case of the inverter apparatus in which a direct current power source of a battery or the like is made to substitute for the alternating current power source and the converter portion, by decelerating the alternating current motor in the overexcited state by the similar method, the decelerating time period can be shortened. Further, although the time constant adjusting portion 9 of FIG. 2 is shown by the example of changing the time constant in the linear shape relative to the current detected value, a similar effect is achieved by defining the time constant by an arbitrary function. Further, although the gain adjusting portion 14 of FIG. 4 is shown by the example of changing the gain in a linear shape relative to the current detected value, a similar effect is achieved by defining the gain by an arbitrary function. Further, although according to the voltage instruction maintaining portion 18 of FIG. 10, the frequency is changed to constitute an original rate of the frequency to the voltage up to f1₁ through f1₂, a similar effect is achieved by constituting the voltage instruction maintaining portion 18 by an arbitrary function. Further, although according to the voltage instruction reducing amount calculating portion 19 of FIG. 11, the dead zone is provided relative to the current and the voltage reducing amount is calculated in proportion to the current, a similar effect is achieved even when the voltage instruction reducing amount calculating portion 19 is constituted by an arbitrary function.

The invention claimed is:

1. A method of reducing a speed of an alternating current motor, the alternating current motor being driven by a voltage type inverter including a voltage correcting portion, the correction portion corrects a given voltage instruction based on a value generated by passing a direct current bus voltage detected value through a first degree delay filter, the method comprising:
    reducing the speed in an overexcited state by multiplying the given voltage instruction by a set gain; and
    simultaneously making a time constant of the first element delay filter larger than a time constant thereof in a normal control state.

2. The method of reducing a speed of an alternating current motor according to claim 1, wherein
    when a detected value of a current flowing in the alternating current motor becomes equal to or larger than a predetermined value, the time constant of the first degree delay filter is shortened in accordance with a magnitude of the current to return to the time constant in the normal control state.

3. The method of reducing a speed of an alternating current motor according to claim 1, wherein
when a detected value of a d axis current flowing in the alternating current motor becomes equal to or larger than a predetermined value, a time constant of the first degree delay filter is shortened in accordance with a magnitude of the d axis current to return to the time constant in the normal control state.

4. The method of reducing a speed of an alternating current motor according to claim 1, wherein
when a detected value of a q axis current flowing in the alternating current motor becomes equal to or larger than a predetermined value, a time constant of the first degree delay filter is shortened in accordance with a magnitude of the q axis current to return to the time constant in the normal control state.

5. A voltage type inverter apparatus comprising:
a voltage correcting portion that corrects a given voltage instruction based on a value generated by passing a direct current bus voltage detected value through a first degree delay filter, wherein
in decelerating a speed of the alternating current motor, the speed is decelerated in an overexcited state by multiplying the given voltage instruction by a set gain simultaneously making a time constant of the first degree delay filter larger than a time constant in a normal control state.

6. The inverter apparatus according to claim 5, wherein
when a detected value of a current flowing in the alternating current motor becomes equal to or larger than a predetermined value, the time constant of the first degree delay filter is shortened in accordance with a magnitude of the current to return to the time constant in the normal control state.

7. The inverter apparatus according to claim 5, wherein
when a detected value of a d axis current flowing in the alternating current motor becomes equal to or larger than a predetermined value, the time constant of the first degree delay filter is shortened in accordance with a magnitude of the d axis current to return to the time constant in the normal control state.

8. The inverter apparatus according to claim 5, wherein
when a detected value of a q axis current flowing in the alternating current motor becomes equal to or larger than a predetermined value, the time constant of the first degree delay filter is shortened in accordance with a magnitude of the q axis current to return to the time constant in the normal control state.

* * * * *